US010642986B2

United States Patent
Sharifi Mehr

(10) Patent No.: US 10,642,986 B2
(45) Date of Patent: *May 5, 2020

(54) DETECTING UNKNOWN SOFTWARE VULNERABILITIES AND SYSTEM COMPROMISES

(71) Applicant: Amazon Technologies, Inc., Seattle, WA (US)

(72) Inventor: Nima Sharifi Mehr, Vancouver (CA)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/012,020

(22) Filed: Jun. 19, 2018

(65) Prior Publication Data

US 2018/0300488 A1 Oct. 18, 2018

Related U.S. Application Data

(63) Continuation of application No. 14/837,390, filed on Aug. 27, 2015, now Pat. No. 10,032,031.

(51) Int. Cl.
*G06F 21/57* (2013.01)
*G06F 21/51* (2013.01)

(52) U.S. Cl.
CPC ............ *G06F 21/577* (2013.01); *G06F 21/51* (2013.01); *G06F 2221/033* (2013.01)

(58) Field of Classification Search
CPC ......... G06F 21/50; G06F 21/52; G06F 21/577
USPC .......................................................... 726/5
See application file for complete search history.

(56) References Cited

U.S. PATENT DOCUMENTS

| 7,131,143 | B1 | 10/2006 | LaMacchia et al. |
| 7,454,794 | B1 | 11/2008 | Hibberd |
| 7,562,360 | B2 | 7/2009 | Tai et al. |
| 7,870,387 | B1* | 1/2011 | Bhargava ............... G06F 21/52 713/165 |
| 8,181,248 | B2 | 5/2012 | Oh et al. |
| 8,316,237 | B1 | 11/2012 | Felsher et al. |
| 8,490,191 | B2 | 7/2013 | Kuegler et al. |
| 8,527,013 | B2 | 9/2013 | Guba et al. |
| 8,813,232 | B2 | 8/2014 | Sreedharan et al. |
| 9,246,938 | B2 | 1/2016 | Alme |
| 9,250,884 | B2 | 2/2016 | Ravi |
| 9,294,498 | B1* | 3/2016 | Yampolskiy ........ H04L 63/1433 |
| 9,509,697 | B1 | 11/2016 | Salehpour |

(Continued)

OTHER PUBLICATIONS

U.S. Appl. No. 14/837,403, filed Aug. 27, 2015, Non-Final Office Action dated Aug. 11, 2017.

(Continued)

*Primary Examiner* — Lynn D Feild
*Assistant Examiner* — Viral S Lakhia
(74) *Attorney, Agent, or Firm* — Thomas | Horstemeyer, LLP

(57) ABSTRACT

Disclosed are various embodiments for detecting unknown software vulnerabilities and system compromises. During a learning period, it is determined which of a plurality of portions of a software package are invoked. At least one unused portion of the software package is determined based at least in part on the portions of the software package invoked during the learning period. Access to the unused portion(s) of the software package is then prevented.

20 Claims, 12 Drawing Sheets

(56) References Cited

U.S. PATENT DOCUMENTS

| | | | |
|---|---|---|---|
| 9,509,704 B2* | 11/2016 | Roever | H04L 63/08 |
| 9,594,881 B2 | 3/2017 | Bhargava et al. | |
| 9,678,718 B1 | 6/2017 | Bienkowski et al. | |
| 9,813,437 B2* | 11/2017 | Yumer | G06F 21/577 |
| 2004/0117624 A1 | 6/2004 | Brandt et al. | |
| 2007/0192864 A1 | 8/2007 | Bryant et al. | |
| 2011/0010697 A1 | 1/2011 | Golovkin | |
| 2011/0023118 A1 | 1/2011 | Wright | |
| 2011/0099602 A1 | 4/2011 | Apparao et al. | |
| 2011/0154487 A1 | 6/2011 | Nakayama et al. | |
| 2011/0197280 A1* | 8/2011 | Young | G06F 21/552 726/24 |
| 2012/0047573 A1* | 2/2012 | Duncan | H04L 29/12915 726/13 |
| 2012/0239981 A1 | 9/2012 | Franke et al. | |
| 2013/0117843 A1 | 5/2013 | Komaromy et al. | |
| 2013/0227112 A1* | 8/2013 | Lehmann | G06F 16/9574 709/224 |
| 2013/0227690 A1 | 8/2013 | Kawaguchi et al. | |
| 2013/0232540 A1 | 9/2013 | Saidi et al. | |
| 2014/0115330 A1 | 4/2014 | Chen | |
| 2015/0199514 A1* | 7/2015 | Tosa | G06F 21/554 726/17 |
| 2015/0205964 A1* | 7/2015 | Eytan | G06F 21/568 726/23 |
| 2015/0277967 A1 | 10/2015 | Calciu et al. | |
| 2015/0312267 A1 | 10/2015 | Thomas | |
| 2016/0094552 A1 | 3/2016 | Durham et al. | |
| 2016/0098562 A1 | 4/2016 | Hawblitzel et al. | |
| 2016/0241574 A1 | 8/2016 | Kumar et al. | |
| 2016/0300049 A1 | 10/2016 | Guedalia et al. | |
| 2016/0315960 A1 | 10/2016 | Teilhet et al. | |
| 2016/0366167 A1* | 12/2016 | Yumer | G06F 21/50 |
| 2018/0219910 A1* | 8/2018 | Greenshpan | H04L 63/1441 |

OTHER PUBLICATIONS

U.S. Patent Application entitled ""Detecting Malicious Activities by Imported Software Packages."" filed Aug. 27, 2015 under U.S. Appl. No. 14/837,403.

U.S. Patent Application entitled "Reducing Privileges for Imported Software Packages," filed Aug. 27, 2015 under U.S. Appl. No. 14/834,401.

U.S. Patent Application entitled "Establishing Risk Profiles for Software Packages," filed Aug. 27, 2015 under U.S. Appl. No. 14/837,385.

\* cited by examiner

DETECTING UNKNOWN SOFTWARE VULNERABILITIES AND SYSTEM COMPROMISES

CROSS-REFERENCE TO RELATED APPLICATIONS

This application is a continuation of, and claims priority to, co-pending U.S. patent application entitled "DETECTING UNKNOWN SOFTWARE VULNERABILITIES AND SYSTEM COMPROMISES," filed on Aug. 27, 2015, and assigned application Ser. No. 14/837,390, which is incorporated herein by reference in its entirety.

BACKGROUND

The process of developing software often involves integrating third-party software packages. For nearly all types of software, important building blocks have already been developed by others. The use of software libraries and packages developed by third parties can significantly speed software development and may result in fewer errors. In some cases, the packages may be open source and free to use depending on the license and nature of use. Generally, there is a blind trust on what these packages do. However, such packages may suffer from unknown security vulnerabilities and exploits. Without a comprehensive review of every imported package, there is no guarantee that these packages do not contain malicious code (e.g., code that performs data exfiltration). Therefore, the use of such packages may be dangerous from a security standpoint.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Generally, the present disclosure relates to approaches for increasing security in computing systems that employ third-party or imported software packages. In modern software engineering, reliance on third-party software packages is expected, even for organizations having large in-house software development teams. Such packages may correspond to standalone programs, applications, and services, or libraries of code used in internal programs, applications, and services. The use of third-party packages can speed software development and can greatly reduce development costs.

However, the use of third-party packages can introduce security vulnerabilities into computing environments that are otherwise secure. In using third-party packages, an organization is unlikely to review all of the code in the third-party packages thoroughly, as compared with internal, trusted code. Because third-party packages are widely used and may be open source, malicious users are likely to discover security vulnerabilities. Despite employing best practices for computer security, organizational deployments of third-party packages may be susceptible to newly released, "zero-day" exploits or private exploits that are otherwise unknown and unpatched. Various embodiments of the present disclosure introduce techniques that can guard against malicious uses or exploits of third-party software packages, even when the exact mechanism of exploitation is unknown.

Figure 1A:
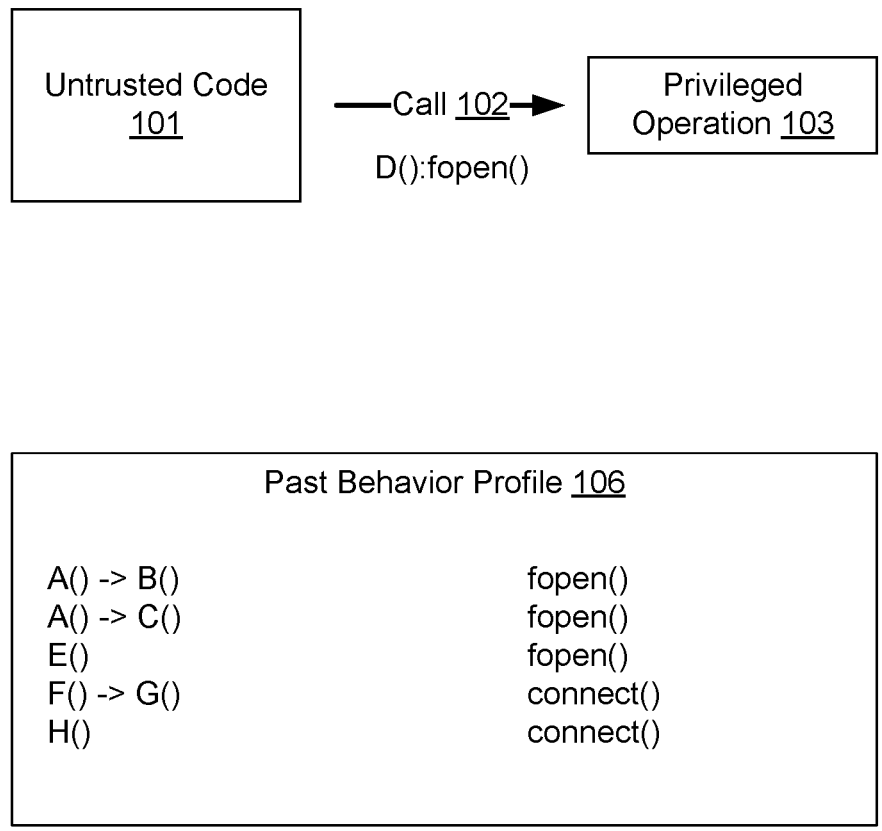
FIGS. 1A-1E are pictorial diagrams illustrating example scenarios of various embodiments of the present disclosure.

Turning now to FIG. 1A, shown is a pictorial diagram 100 of an example scenario involving the execution of untrusted code 101 within a computing environment according to an embodiment. The untrusted code 101, which may be an imported software library within trusted code, makes a call 102 that invokes a privileged operation 103. In this case, a call stack for the call 102 indicates that the method "D( )" in the untrusted code 101 has invoked a privileged operation 103 of "fopen( )" to read a file.

However, the execution of the untrusted code 101 has been observed previously during a learning period, and a past behavior profile 106 has been generated for the untrusted code 101. The past behavior profile 106 indicates call stacks associated with the untrusted code 101 and corresponding privileged operations 103 invoked by the call stacks. For example, it has been observed that method "A( )" from the untrusted code 101 has called method "B( )" which invoked the "fopen( )" operation. Similarly, it has been observed that method "H( )" of the untrusted code 101 has invoked the "connect( )" operation.

According to the past behavior profile 106, there are no recognized occurrences of the method "D( )" invoking the privileged operation 103 of "fopen( )" Therefore, this particular call 102 appears to be suspicious and may indicate that the untrusted code 101 has been compromised. While a compromise may have occurred, in other situations it may be that the service using the untrusted code 101 may have been updated, the untrusted code 101 may have been updated, or another customer may be using the service differently. One or more actions may be taken in response to detecting the abnormality, such as raising an alarm, blocking the call 102, terminating the process running the untrusted code 101, or other actions.

Figure 1B:
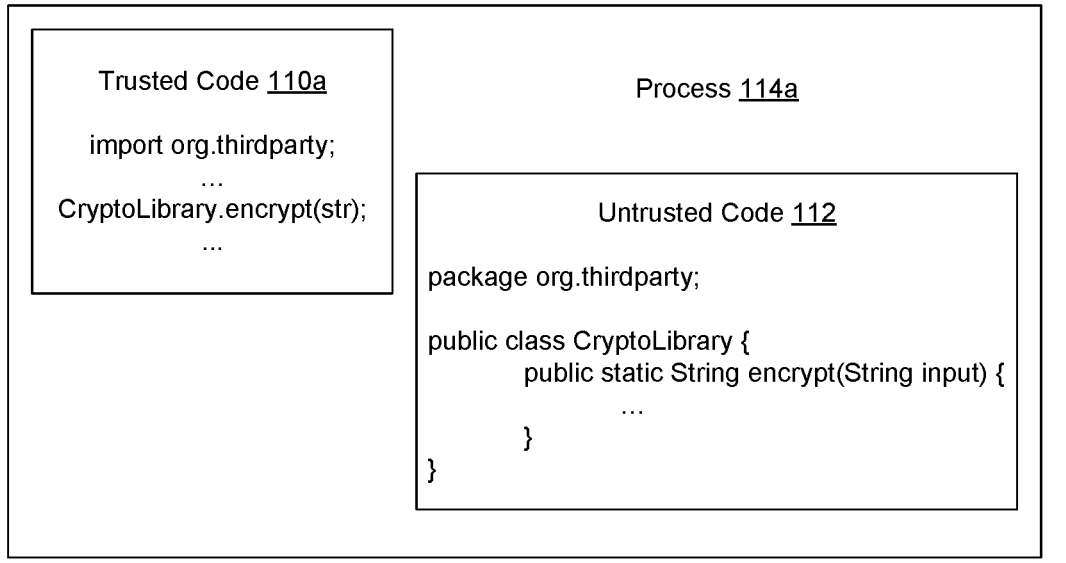
Figure 1B:
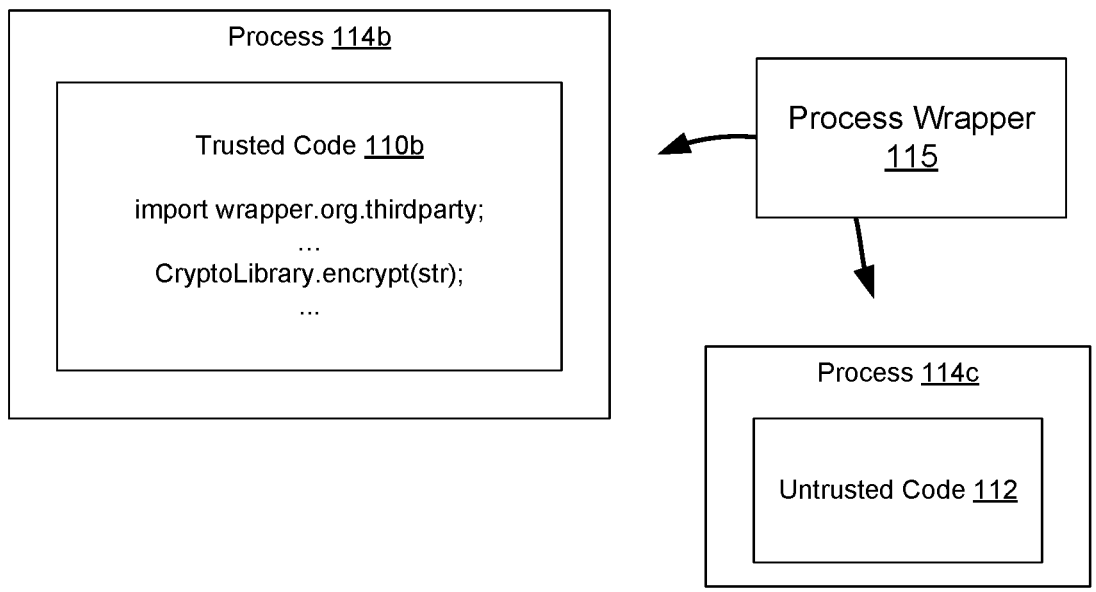

Moving on to FIG. 1B, shown are pictorial diagrams 109a and 109b of example scenarios involving process separation to reduce privileges of imported software packages within a computing environment according to another embodiment. As depicted by pictorial diagram 109a, trusted code 110a that invokes untrusted code 112, such as from an imported software library, invokes the untrusted code 112 within the same process 114a or within a child process. In either case, the untrusted code 112 is permitted to execute with the same privileges as the trusted code 110a. In this example, the trusted code 110a imports the untrusted code 112 via an import statement ("import org.thirdparty;") and then invokes an encryption method ("CryptoLibrary.encrypt(str)").

However, assigning the same privileges to the untrusted code 112 as the trusted code 110a is often unnecessary. For example, the untrusted code 112 may require access to read files to perform legitimate functions as requested by the trusted code 110a, but network access may be unnecessary. If the untrusted code 112 were compromised, the untrusted code 112 could be used to launch a network-based attack upon another network host. The attack would leverage the network access privilege that should never have been provided to the untrusted code 112 in the first place.

As depicted by pictorial diagram 109b, the trusted code 110b may be modified so that the untrusted code 112 is invoked by way of a process wrapper 115 that performs a proxy function. In one implementation, the import statement in the trusted code 110b may be changed to point to the process wrapper 115 ("import wrapper.org.thirdparty;"), thereby removing the untrusted code 112 from the scope of the trusted code 110b. Alternatively, one or more environmental variables may be updated, thereby avoiding code changes in the trusted code 110b. Further, the call to the encryption method in the untrusted code 112 is replaced with a call to a stub method of the process wrapper 115. This can involve explicitly changing the trusted code 110b with a call to a different class or method name (e.g., "wrap_CryptoLibrary.encrypt(str);"), or it can involve leaving the call as-is but removing the untrusted code 112 from the scope of the trusted code 110b.

Upon compilation and execution, the trusted code 110b executes in a process 114b having the same privileges as the process 114a. By contrast, the process wrapper 115 is configured to execute the untrusted code 112 within a separate process 114c that has a reduced level of privileges. Via the call to the stub method, the process wrapper 115 is configured to facilitate inter-process communication between the process 114b and the process 114c. Thus, if the untrusted code 112 were compromised, the untrusted code 112 would not have network access privileges via the process 114c, for example, thereby blocking the network-based attack.

Figure 1C:
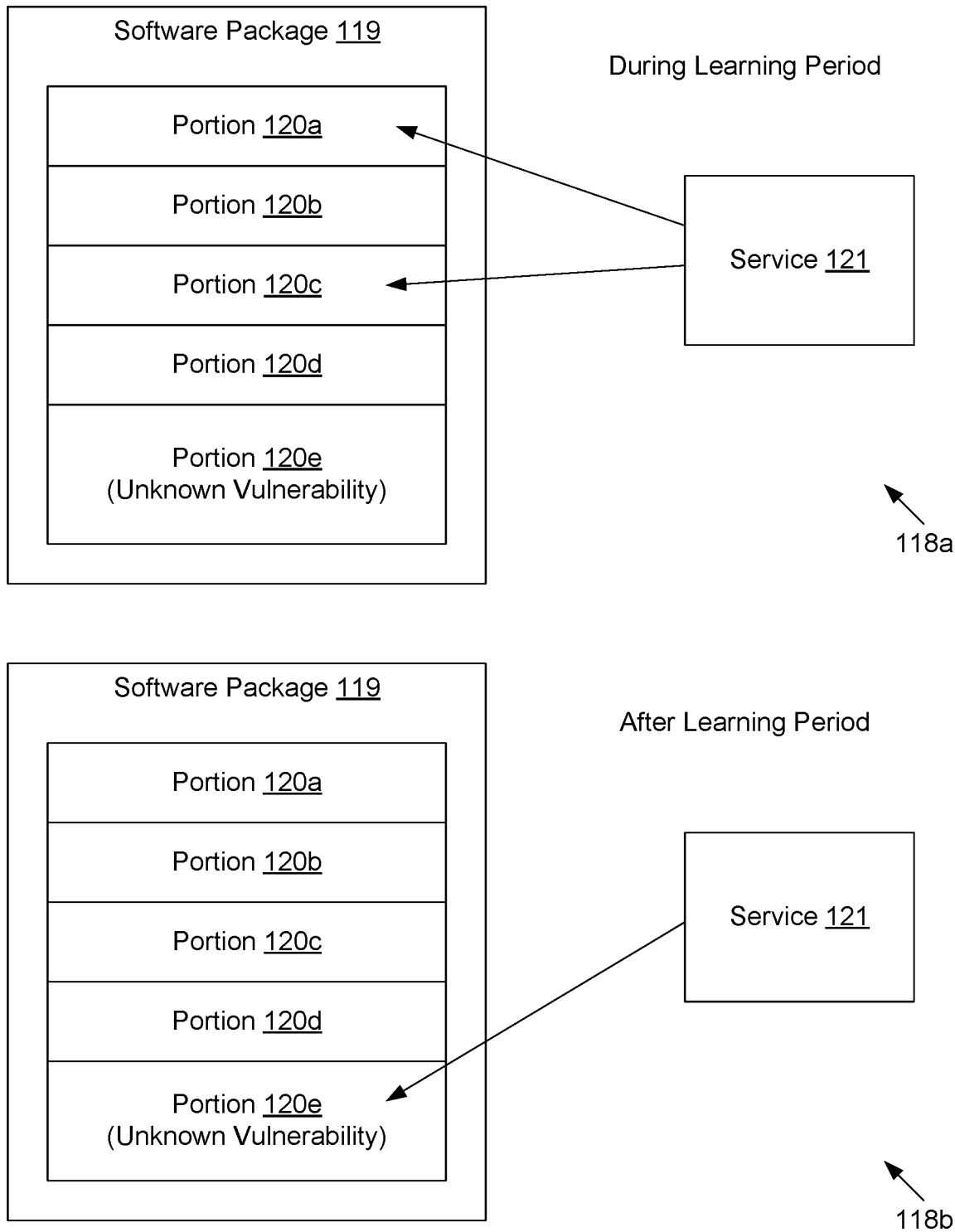

Continuing on to FIG. 1C, shown are pictorial diagrams 118a and 118b depicting example scenarios involving profiling access to code portions of a software package 119 within a computing environment according to an embodiment. As shown in pictorial diagram 118a, a third-party software package 119 may include many portions 120a-120e, some of which may be used and some of which may not be used during a learning period. The portions 120 may correspond to files, packages, classes, methods, and/or other logical divisions of a software package 119. A service 121 may rely on and invoke specific functionality from portions 120a and 120c, but not portions 120b, 120d, or 120e. As depicted, the portion 120e may include an unknown security vulnerability, but this is not necessarily problematic as an initial matter because the service 121 does not use the portion 120e.

In pictorial diagram 118b, the service 121 invokes the portion 120e after the learning period. For example, a malicious user may manipulate the service 121 to invoke the portion 120e to exploit the unpatched vulnerability, which could be a buffer overflow, remote backdoor, or another security issue. By creating a profile during the learning period, the access to the portion 120e appears unusual and can trigger one or more other actions to be performed. For example, the execution of the portion 120e can be blocked, the service 121 can be terminated, an alarm can be raised, or other actions can be performed.

In some embodiments, portions 120b, 120d, and 120e that are identified as unused during a learning period may be removed. If the service 121 were to attempt to invoke the portion 120e after the learning period, the service 121 may generate exceptions or crash, but the vulnerability in the portion 120e would not be exploited.

Figure 1D:
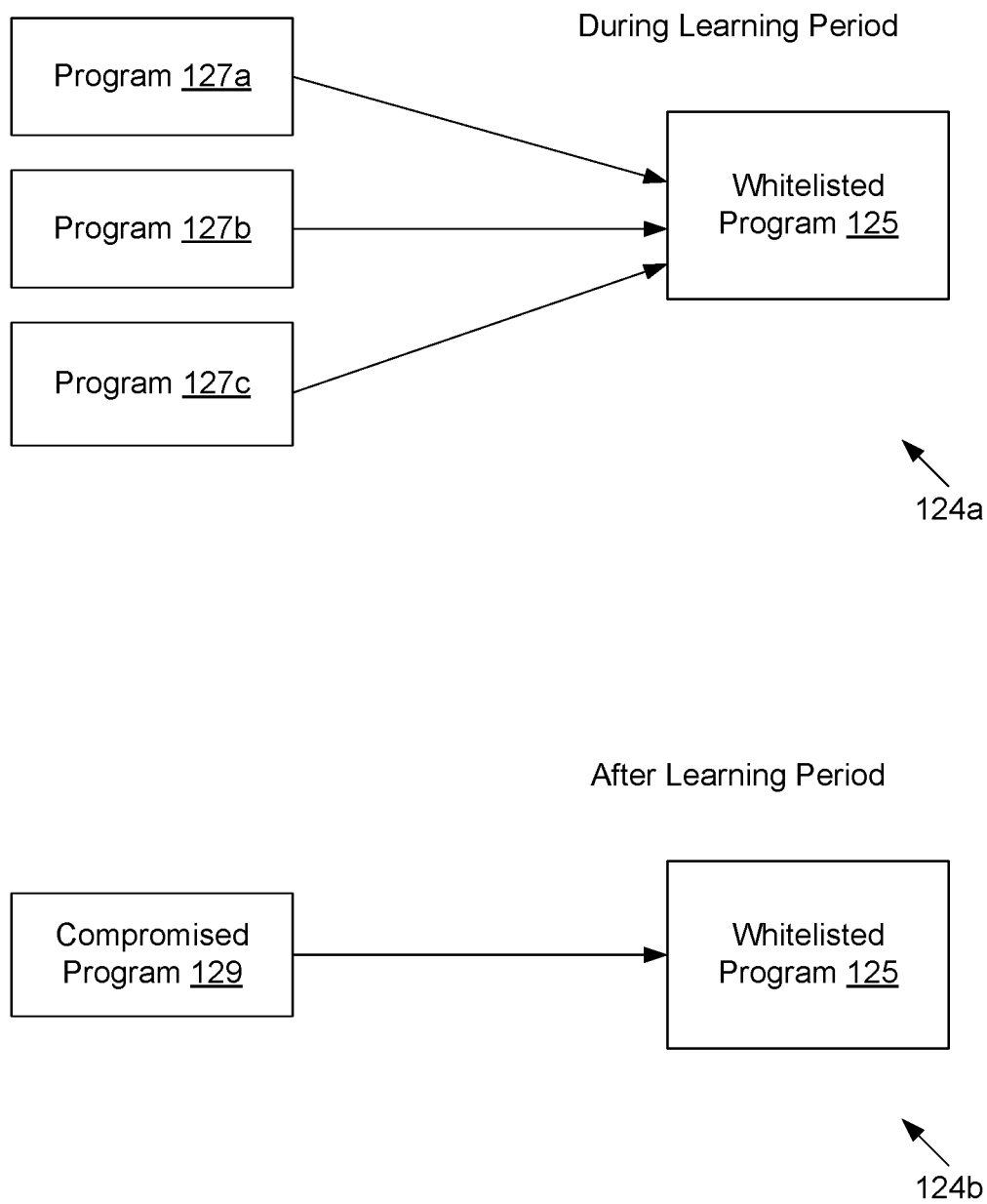

Referring next to FIG. 1D, shown are pictorial diagrams 124a and 124b depicting example scenarios involving profiling process execution trees within a computing environment according to an embodiment. In the pictorial diagram 124a, programs 127a, 127b, and 127c invoke a whitelisted program 125 during a learning period. The whitelisted program 125 is considered whitelisted due to the various privileges granted to it within the computing environment. A profile may be generated that associates the programs 127a, 127b, and 127c with the whitelisted program 125.

In the pictorial diagram 124b, a compromised program 129 invokes the whitelisted program 125 after the learning period. Although it may not be known that the compromised program 129 is in fact compromised, the invocation of the whitelisted program 125 appears unusual and inconsistent with the profile generated during the learning period. For example, the compromised program 129 may not have file read access but may invoke the whitelisted program 125 in order to read a file. Consequently, upon detection of the inconsistent behavior, one or more remedial actions may be taken, such as reducing privileges from the whitelisted program 125 by removing the whitelisting or executing the whitelisted program 125 as a different user, blocking the compromised program 129, blocking the whitelisted program 125, raising an alarm, or other actions.

Figure 1E:
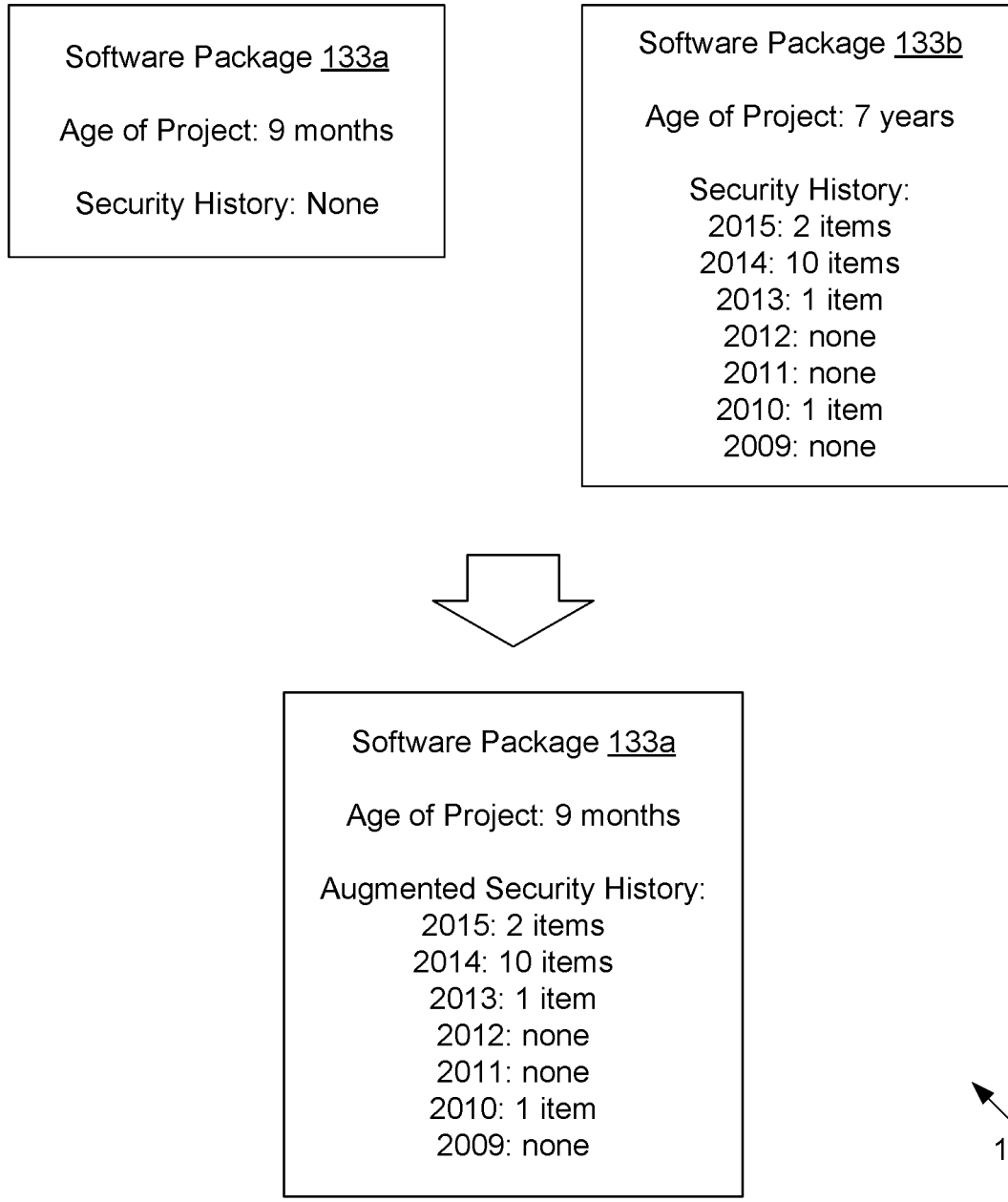

Moving now to FIG. 1E, shown is a pictorial diagram 130 of an example scenario involving building a risk profile for a software package that lacks sufficient security history according to an embodiment. When using third-party software packages, it is not uncommon to encounter packages that lack security history information. For example, the package may be relatively new or may lack a broad user base. However, a security history may be necessary in order to assess the risk posed to the computing environment of an organization prior to installing the package.

In this example, the software package 133a is a relatively new project with an age of only nine months. Also, the software package 133a completely lacks a security history. By comparison, the software package 133b is a much older project at seven years old and has a lengthy security history, which may include security issues such as denial of service vulnerabilities and remote code exploits.

If the software packages 133a and 133b are otherwise determined to be similar based at least in part on a comparison of a plurality of factors, the security history of the software package 133b may be used to augment the insufficient security history of the software package 133a. The augmented security history may then be evaluated to determine a baseline risk level for the software package 133a, which may result in allowing or disallowing the software package 133a to be installed, granting or restricting privileges for the software packages 133a, or other consequences.

In the following discussion, a general description of the system and its components is provided, followed by a discussion of the operation of the same.

Figure 2:
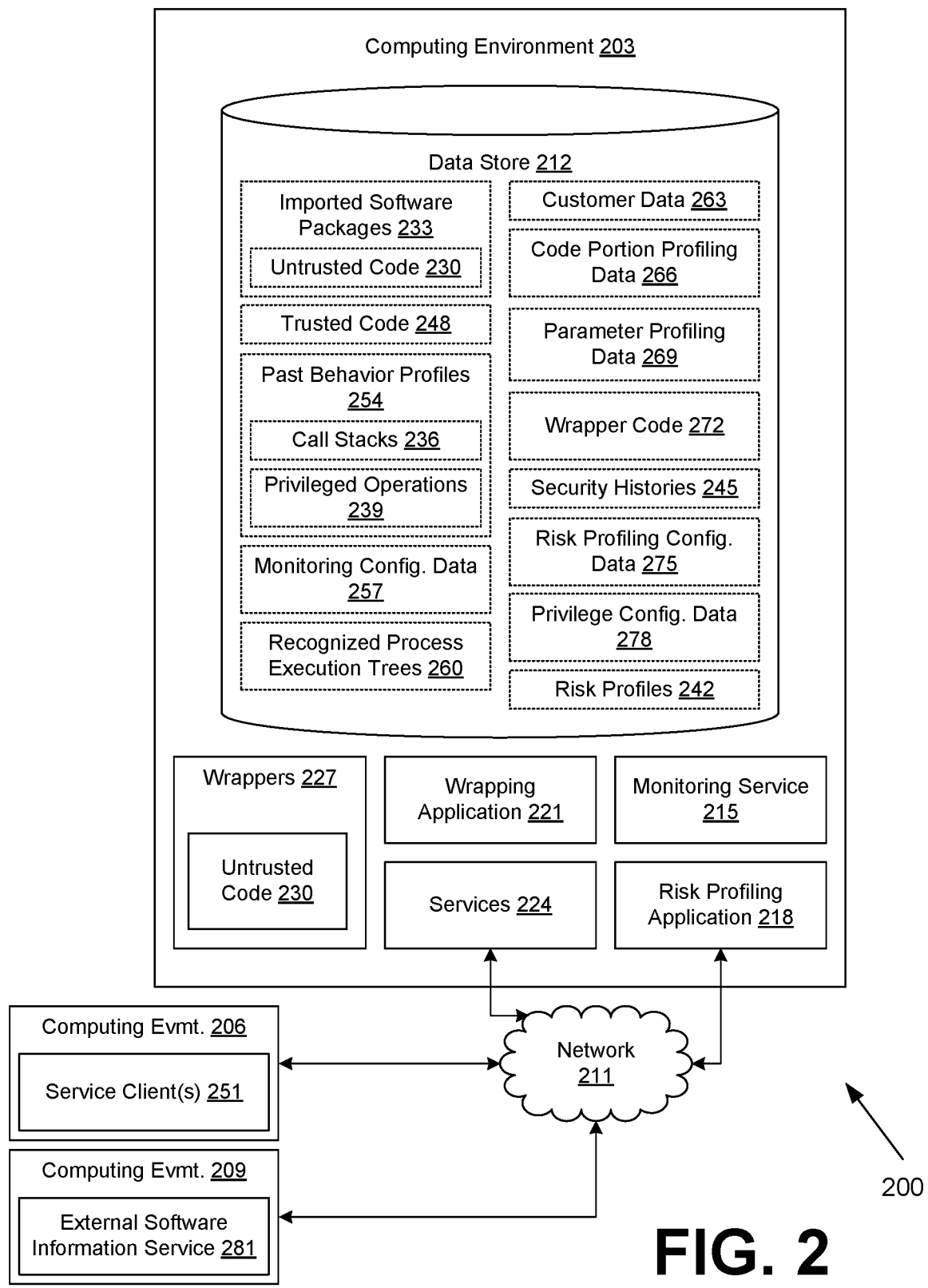
FIG. 2 is a schematic block diagram of a networked environment according to various embodiments of the present disclosure.

With reference to FIG. 2, shown is a networked environment 200 according to various embodiments. The networked environment 200 includes a computing environment 203, a computing environment 206, and a computing environment 209, which are in data communication with each other via a network 211. The network 211 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a monitoring service 215, a risk profiling application 218, a wrapping application 221, one or more services 224, one or more wrappers 227, and other applications, services, processes, systems, engines, or functionality not discussed in detail herein. The monitoring service 215 is executed to monitor the execution of untrusted code 230 from imported software packages 233 in order to compare actual behavior with expected behavior determined via profiling during one or more learning periods.

In a first embodiment, during a learning period, the monitoring service 215 profiles call stacks 236 where untrusted code 230 has invoked corresponding privileged operations 239. After the learning period, the monitoring service 215 determines whether a call stack 236 and privileged operation 239 invoked by the untrusted code 230 corresponds to expected behavior.

In a second embodiment, during a learning period, the monitoring service 215 profiles which portions of imported software packages 233 are being accessed by a service 224 or other program. After the learning period, the monitoring service 215 determines whether an unexpected portion of an imported software package 233 is being accessed by the service 224 or other program. In one implementation, the portions of the imported software packages 233 that are not accessed by a service 224 or other program during the learning period may be removed, blocked, or otherwise rendered unexecutable.

In a third embodiment, during a learning period, the monitoring service 215 profiles process execution trees with respect to whitelisted programs 125 (FIG. 1D). After the learning period, the monitoring service 215 determines whether unexpected processes are invoking a whitelisted program 125.

The risk profiling application 218 is executed to generate risk profiles 242 for various imported software packages 233 according to factors present in their corresponding security histories 245. However, in the case that an imported software package 233 has an insufficient security history 245, the risk profiling application 218 may be configured to identify one or more other imported software packages 233 that are similar to the imported software package 233 having the insufficient security history 245. The risk profiling application 218 then uses the corresponding security histories 245 to augment the insufficient security history 245 for purposes of generating the risk profile 242.

The wrapping application 221 is executed to modify trusted code 248 and/or the environment of the trusted code 248 to move invocations of untrusted code 230 to a wrapper 227. Thus, rather than executing within the same process or thread as the trusted code 248 and having the same privileges, the untrusted code 230 can be executed in a different process or thread that has reduced privileges.

The services 224 correspond to trusted code 248 that is configured to respond to service requests from service clients 251. The services 224 may correspond to internally developed code that is maintained by the organization that operates the computing environment 203. The service 224 may invoke untrusted code 230 from various imported software packages 233. In some embodiments, the service 224 may be modified to communicate with a wrapper 227 executing the untrusted code 230 via inter-process communication, domain sockets, named pipes, remote procedure calls (RPC), or other approaches, so that the untrusted code 230 does not necessarily inherit all privileges of the service 224. The wrapper 227 may be in a different process or thread as compared to the service 224. In some cases, the wrapper 227 may be deployed on a different computing device, virtual machine, or host as compared to the service 227.

The data stored in the data store 212 includes, for example, imported software packages 233, trusted code 248, past behavior profiles 254, monitoring configuration data 257, recognized process execution trees 260, customer data 263, code portion profiling data 266, parameter profiling data 269, wrapper code 272, security histories 245, risk profiling configuration data 275, privilege configuration data 278, risk profiles 242, and potentially other data.

The imported software packages 233 correspond to distributions of software from external entities or third parties. The imported software packages 233 may correspond to open source or closed source software. The imported software packages 233 may be distributed in source code, object code, bytecode, and/or other formats. For example, an imported software package 233 may be distributed as a JAVA archive file (JAR), a GZipped tar file, and/or other distribution types. The imported software packages 233 may include or be compiled to create executable files that are intended to be executed as separate processes. Alternatively, the imported software packages 233 may correspond to library code that is included in or linked (statically or dynamically) to other trusted code 248. Because the imported software packages 233 may not have undergone a comprehensive internal code review for the organization operating the computing environment 203, the imported software packages 233 may be deemed to include untrusted code 230.

The trusted code 248 corresponds to internal code of the computing environment 203 that is generally considered trusted. For example, the trusted code 248 may have undergone a comprehensive security review.

The past behavior profiles 254 are generated by the monitoring service 215 during a learning period in observing call stacks 236 and privileged operations 239 associated with untrusted code 230. A call stack 236 corresponds to a sequence of procedure or method calls which culminates in a system call corresponding to a privileged operation 239. For example, a call stack 236 may indicate that method A invoked method B, which in turn invoked method C, and method C invoked a system call.

A privileged operation 239 corresponds to any operation that requires special privileges in a computing environment 203. Non-limiting examples of privileged operations 239 include file read operations, file write operations, network access operations, inter-process communication operations, and others. What is considered privileged in one computing environment 203 may not be considered privileged in another computing environment 203.

The past behavior profiles 254 may be encoded so as to reduce search times. For example, a call stack 236 and its corresponding privileged operation 239 may be hashed using an algorithm such as secure hash algorithm (SHA-256). The resulting hash value may be stored in the past behavior profile 254 in the data store 212 and used for comparisons. In one implementation, a Bloom filter may be employed in the past behavior profiles 254 to enable a fast determination as to whether a call stack/privileged operation combination is present.

The monitoring configuration data 257 may include various parameters that control the operation of the monitoring service 215. Specifically, the monitoring configuration data 257 may include parameters that define when the monitoring service 215 enters or exits a learning period. The monitoring configuration data 257 may enable a level of monitoring to be performed, e.g., process level, class level, method level, etc. The monitoring configuration data 257 may also configure which action(s) are to be performed when an abnormality or potential compromise is detected.

The recognized process execution trees 260 correspond to a profile of process execution trees for a given program that were observed by the monitoring service 215 during one or more learning periods. A process execution tree indicates a sequence of calls between processes. For example, process A may call process B, which may then call process C. The process execution trees may be obtained by the monitoring service 215 through an operating system utility such as "pstree" on Unix platforms.

The customer data 263 may include information describing customers of the services 224. It is noted that the usage of the services 224 may change depending upon a change in customers.

The code portion profiling data 266 is generated by the monitoring service 215 according to observation as to which portions of an imported software package 233 are actually used or remain unused during one or more learning periods. The code portion profiling data 266 may also or instead profile usage frequency of various portions of imported software packages 233 during one or more learning periods.

The parameter profiling data 269 is generated by the monitoring service 215 and profiles parameters provided to processes during one or more learning periods. In particular, the parameter profiling data 269 may track a number of parameters, parameter data types, parameter size, parameter data content, and/or other characteristics of parameters provided to processes.

The wrapper code 272 may be employed by the wrapping application 221 to create wrappers 227 enveloping untrusted code 230 and to modify trusted code 248 to invoke the wrappers 227 instead of the untrusted code 230. To this end, the wrapper code 272 may configure the generation of class/method stubs for replacement of calls to the untrusted code 230 within the trusted code 248. Further, the wrapper code 272 may enable inter-process communication between the trusted code 248 and the untrusted code 230.

The security histories 245 track a history of security incidents for respective imported software packages 233. The security incidents may be classified according to severity, type of vulnerability, and/or other factors. The security histories 245 may be obtained from the external software information service 281 by way of the network 211.

The risk profiling configuration data 275 includes parameters for configuring the operation of the risk profiling application 218. In this regard, the parameters may control calculation of a sufficiency measure relative to sufficiency of the security histories 245, along with thresholds for sufficiency. The parameters may also control calculation of a similarity measure to compare two imported software packages 233, along with thresholds for similarity. Further, the parameters may control determination of a risk level in a risk profile 242 for an imported software package 233 based at least in part on the security history 245, along with implications such as actions taken in response to particular risk levels.

The privilege configuration data 278 may configure which privileges are to be provided to which services 224, wrappers 227, and/or other programs and applications executed in the computing environment 203. It is noted that wrappers 227 may be provided with a reduced level of privilege as to the process in which the trusted code 248 is executed (e.g., the service 224). Different wrappers 227 may be assigned different privilege levels depending on which privileges are necessary for the untrusted code 230 to perform requested functionality.

The risk profiles 242 indicate a level of risk for the imported software packages 233. For example, the risk profiles 242 may include a risk score computed based at least in part on the security histories 245 of the corresponding imported software packages 239. A risk profile 242 may indicate that an imported software package 233 is too risky to be installed in the computing environment 203, a package is allowed or disallowed to have certain privileges, certain precautions are to be taken for installation of a package, the monitoring service 215 is to be used in a certain way given the risk level, and so on.

The computing environments 206 and 209 may each comprise, for example, a server computer or any other system providing computing capability. Alternatively, the computing environments 206 and 209 may employ a plurality of computing devices that may be arranged, for example, in one or more server banks or computer banks or other arrangements. Such computing devices may be located in a single installation or may be distributed among many different geographical locations. For example, the computing environments 206 and 209 may include a plurality of computing devices that together may comprise a hosted computing resource, a grid computing resource, and/or any other distributed computing arrangement. In some cases, the computing environments 206 and 209 may correspond to an elastic computing resource where the allotted capacity of processing, network, storage, or other computing-related resources may vary over time.

Various applications and/or other functionality may be executed in the computing environments 206 and 209 according to various embodiments. The components executed on the computing environment 203, for example, include a service client 251 and other applications, services, processes, systems, engines, or functionality not discussed in detail herein. The service client 251 makes service requests to one or more services 224 executed in the computing environment 203. The service client 251 may be under control of a customer entity that is different from the entity that controls the services 224.

The components executed on the computing environment 206, for example, include an external software information service 281 and other applications, services, processes, systems, engines, or functionality not discussed in detail herein. The external software information service 281 is executed to provide information regarding imported software packages 233. Such information may include, but is not limited to, security histories 245, project age, number of contributors, identities of contributors, project activity level, programming languages used, dependency packages used, code complexity measures, design patterns used, and/or other information. The information may be supplied in a format such as extensible markup language (XML), JavaScript object notation (JSON), or other formats.

Figure 3:
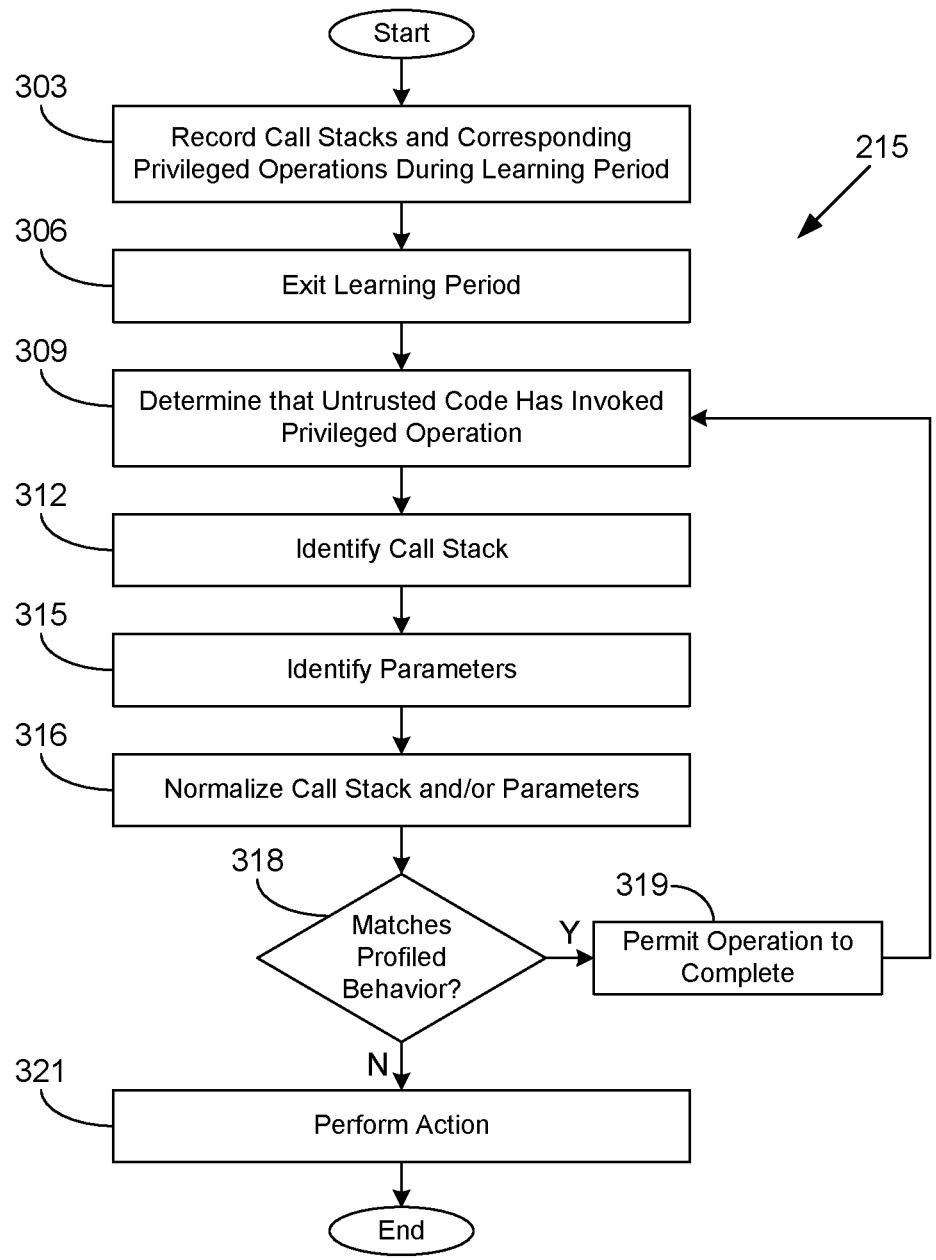
FIG. 3 is a flowchart illustrating one example of functionality implemented as portions of a monitoring service executed in a computing environment in the networked environment of FIG. 2 according to various embodiments of the present disclosure.

Referring next to FIG. 3, shown is a flowchart that provides one example of the operation of a portion of the monitoring service 215 according to various embodiments. It is understood that the flowchart of FIG. 3 provides merely an example of the many different types of functional arrangements that may be employed to implement the operation of the portion of the monitoring service 215 as described herein. As an alternative, the flowchart of FIG. 3 may be viewed as depicting an example of elements of a method implemented in the computing environment 203 (FIG. 2) according to one or more embodiments.

Beginning with box 303, the monitoring service 215 records call stacks 236 (FIG. 2) and their corresponding privileged operations 239 (FIG. 2) for untrusted code 230 (FIG. 2) executed in the computing environment 203 during a learning period. The monitoring service 215 is able to intercept these call stacks 236 and privileged operations 239 via code instrumentation. For example, each system call corresponding to a privileged operation 239 may be instrumented to pass this information to the monitoring service 215 or otherwise record this information. While the discussion herein mentions call stacks 236 and parameters, it is understood that any context relating to untrusted code 230 executing a privileged operation 239 may be monitored.

The monitoring service 215 thereby generates a past behavior profile 254 (FIG. 2) for the untrusted code 230. The past behavior profile 254 acts as a fingerprint for the context in which privileged operations 239 may be permitted. The monitoring service 215 may also record information about the parameters involved in the privileged operations 239 in the parameter profiling data 269 (FIG. 2). Rather than recording call stacks 236, privileged operations 239, and parameters directly, the monitoring service 215 may normalize this data, for example, by removing loops and iterations from the call stacks 236, by hashing this data, or by hashing a combination of this data to facilitate faster comparisons. In some cases, the monitoring service 215 may store this profile data using a Bloom filter.

Parameter information may be broken into classifications or brackets in order to facilitate faster matching in the parameter profiling data 269 (e.g., bracket 1 is total size less than one kilobyte, bracket 2 is total size greater than one kilobyte). Where multiple similar hosts in a computing environment 203 are running the same untrusted code 230, the past behavior profiles 254 may be shared among the multiple hosts. In some implementations, a web service may be provided to share the past behavior profiles 254.

In box 306, the monitoring service 215 exits the learning period. For example, the monitoring service 215 may exit the learning period in response to determining that the call stacks 236 and privileged operations 239 that are being observed are consistent with those already recorded in the past behavior profiles 254 within a threshold amount (e.g., 95% consistent, 100% consistent). In other words, the monitoring service 215 may exit the learning period when the activity of the untrusted code 230 meets a threshold for consistency with a past activity of the untrusted code 230. The recorded activity during the learning period may be manually audited to ensure a secure baseline.

In box 309, after exiting the learning period and entering an enforcement mode, the monitoring service 215 determines that untrusted code 230 has invoked a privileged operation 239. The monitoring service 215 may receive this information via instrumentation, or adding code to programs or to the operating system in order to intercept this information. In box 312, the monitoring service 215 identifies the particular call stack 236 that has invoked this privileged operation 239. The call stack 236 may include a sequence of calls between multiple methods and/or classes of the untrusted code 230. In box 315, the monitoring service 215 may identify information about the parameters passed to this privileged operation 239. The information may include parameter count, parameter size, aggregated parameter size, parameter content, etc. For example, for a file read call, the parameter information may include a filename parameter of "/etc/passwd."

In box 316, the monitoring service 215 may normalize the call stack 236, the parameters, and/or other context data. For example, this may involve removing loops or iterations of calls within the call stack 236, which may be considered equivalent for purposes of comparison. In one implementation, the monitoring service 215 may hash the privileged operation 239, the call stack 236, and/or the parameter information before comparing it to stored hashes in the past behavior profiles.

In box 318, the monitoring service 215 determines whether the privileged operation 239, the call stack 236, and/or the parameter information matches profiled information in the past behavior profiles 254. In other words, the monitoring service 215 determines whether the current behavior is expected behavior according to past behavior.

If the privileged operation 239, the call stack 236, the parameter information, and/or other context data match the profiled behavior, the monitoring service 215 can move from box 318 to box 319 and permit the privileged operation 239 to complete. The monitoring service 215 can then return to box 309 and intercept another privileged operation 239. If the privileged operation 239, the call stack 236, and/or the parameter information do not match the profiled behavior, the monitoring service 215 can instead move from box 318 to box 321.

In box 321, the monitoring service 215 performs one or more actions in response to determining that the privileged operation 239, the call stack 236, and/or the parameter information do not match the profiled behavior. Which action(s) are performed may be controlled based at least in part on parameters stored in the monitoring configuration data 257 (FIG. 2). For example, the monitoring service 215 may send an alarm notification to a supervisory user, block completion of the particular privileged operation 239, block a future execution of the untrusted code 230, remove privileges previously granted to the untrusted code 230, re-enter the learning period upon manual confirmation, or perform other actions. Thereafter, the portion of the monitoring service 215 ends.

It is noted that the call stacks 236, the privileged operations 239, and/or the parameters for the privileged operations 239 may change based upon various factors that are not malicious in nature. For example, the untrusted code 230 may be updated, the trusted code 248 (FIG. 2) that invokes the untrusted code 230 may be updated, there may be a change in customers of a service 224 (FIG. 2) corresponding to the trusted code 248, and/or other factors may be present. If such factors are present, the monitoring service 215 may re-enter the learning period or default to notification rather than perform an action such as blocking execution of the untrusted code 230. Subsequent learning periods may be performed of a more limited scope (e.g., just for untrusted code 230 that has been updated but not all untrusted code 230 in the computing environment 203).

Figure 4:
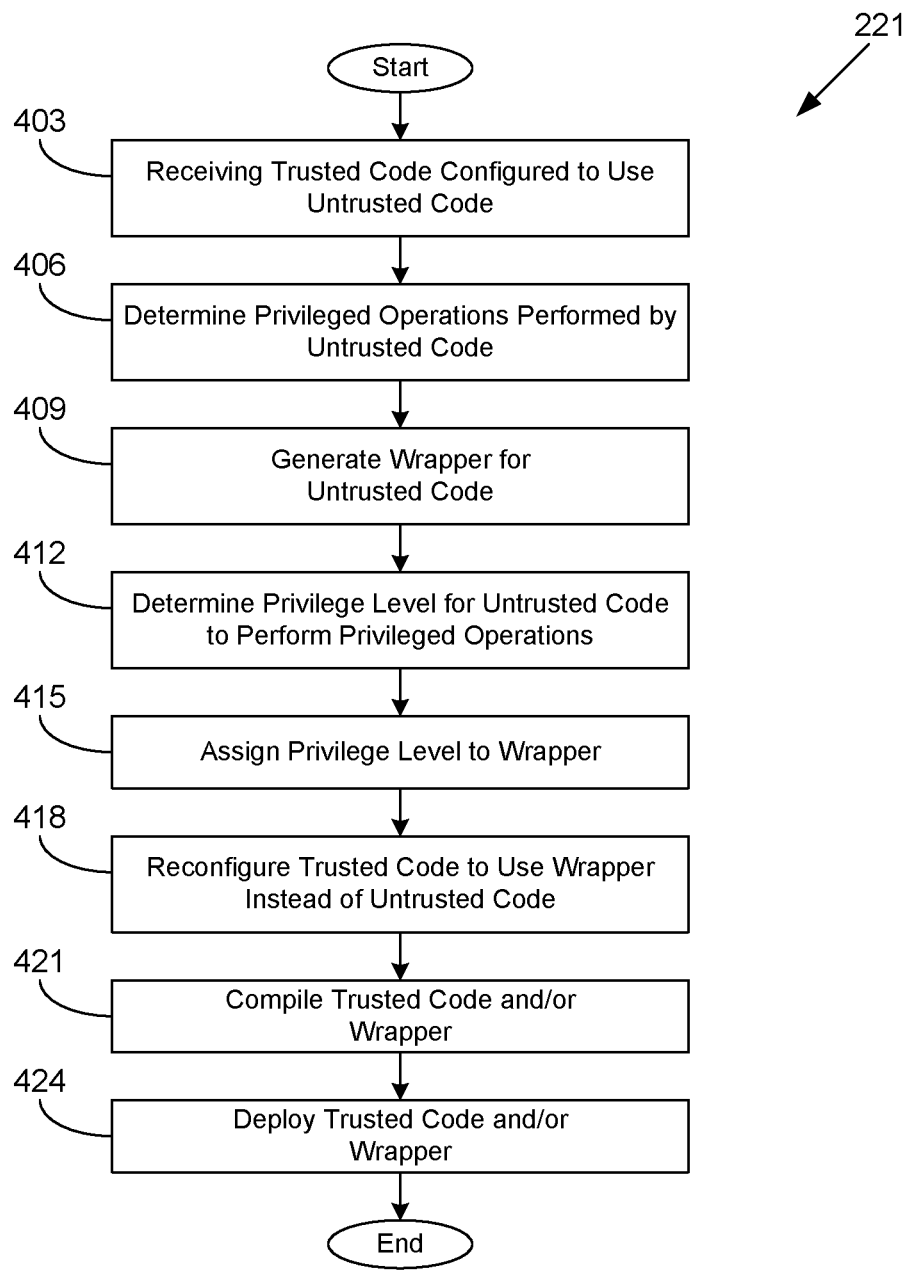
FIG. 4 is a flowchart illustrating one example of functionality implemented as portions of a wrapping application executed in a computing environment in the networked environment of FIG. 2 according to various embodiments of the present disclosure.

Turning now to FIG. 4, shown is a flowchart that provides one example of the operation of a portion of the wrapping application 221 according to various embodiments. It is understood that the flowchart of FIG. 4 provides merely an example of the many different types of functional arrangements that may be employed to implement the operation of the portion of the wrapping application 221 as described herein. As an alternative, the flowchart of FIG. 4 may be viewed as depicting an example of elements of a method implemented in the computing environment 203 (FIG. 2) according to one or more embodiments.

Beginning with box 403, the wrapping application 221 receives trusted code 248 (FIG. 2) that is configured to use untrusted code 230 (FIG. 2) from one or more imported software packages 233 (FIG. 2). In other words, the trusted code 248 may import the untrusted code 230, instantiate classes of the untrusted code 230, call methods or procedures of the untrusted code 230, access global variables of the untrusted code 230, and/or otherwise interact with the untrusted code 230. By interacting with the untrusted code 230 directly, the untrusted code 230 is given all privileges of the trusted code 248 since it is executed within the same process, and privileges are assigned on a per-process basis in many computing environments 203.

In box 406, the wrapping application 221 determines a set of privileged operations 239 (FIG. 2) that are performed by the untrusted code 230. In this regard, the wrapping application 221 may profile or scan the untrusted code 230 to determine the types of privileged operations 239 that are performed. The profiling may be performed by a monitoring service 215 (FIG. 2) during one or more learning periods. It is noted that the privileged operations 239 performed by the untrusted code 230 may not require all of the privileges granted to the trusted code 248.

In box 409, the wrapping application 221 generates a wrapper 227 (FIG. 2) for the untrusted code 230 using the wrapper code 272 (FIG. 2). The wrapper 227 facilitates inter-process communication between the untrusted code 230 and the trusted code 248. In generating the wrapper 227, the wrapping application 221 may scan a publicly exposed application programming interface (API) of the untrusted code 230 and generate proxy procedures for each of individual public procedures from the API.

In box 412, the wrapping application 221 determines a privilege level for the untrusted code 230 to perform the set of privileged operations 239. In box 415, the wrapping application 221 assigns the determined privilege level to the wrapper 227. It is noted that this privilege level may be less than the privilege level granted to the trusted code 248. For example, the trusted code 248 may be capable of performing a privileged operation 239 that the untrusted code 230 is not capable of performing. In assigning the privilege level, the wrapping application 221 configures the wrapper 227 to have one or more privileges to perform the set of privileged operations 239 determined in box 406. In some cases, the privileges and/or privilege level may be received through a manual specification.

In box 418, the wrapping application 221 reconfigures the trusted code 248 to use the wrapper 227 rather than the untrusted code 230. In performing this reconfiguration, the wrapping application 221 may replace calls to the untrusted code 230 with calls to the wrapper 227 in the trusted code 248. Also, the wrapping application 221 may remove the untrusted code 230 from the scope of the trusted code 248. For example, the wrapping application 221 may modify import statements for the trusted code 248 that removes the imported software packages 233 or change environment variables. The wrapping application 221 may instead import stub classes, methods, procedures, global variables, etc., of the wrapper 227. Further, the wrapping application 221 may rename classes, methods, procedures, global variables, etc., of the untrusted code 230 that are referenced in the trusted code 248 in order to point to elements of the wrapper 227. In one implementation, the replacement calls in the trusted code 248 may correspond to the same class names and/or same method/procedure names as before, but because of the change in scope, they invoke corresponding classes and/or methods in the wrapper 227 rather than the untrusted code 230.

In box 421, the wrapping application 221 compiles the trusted code 248 and/or the wrapper 227. The compiled trusted code 248 and the wrapper 227 are configured to be executed in different processes or different threads that have individually configurable privileges. In box 424, the wrapping application 221 initiates a deployment of one or both of the trusted code 248 and the wrapper 227 in the computing environment 203. Thereafter, the portion of the wrapping application 221 ends.

If the API for the untrusted code 230 changes, the procedures of FIG. 4 may be repeated. Also, it is understood that trusted code 248 may use untrusted code 230 from different imported software packages 233, or multiple instances of untrusted code 230 from the same imported software package 233 that do not require the same set of privileges. In one embodiment, different untrusted code 230 may be grouped together within one wrapper 227 if the same set of privileged operations 239 is needed. Similarly, different untrusted code 230 may be given different wrappers 227 if the required sets of privileged operations 239 differ.

Figure 5:
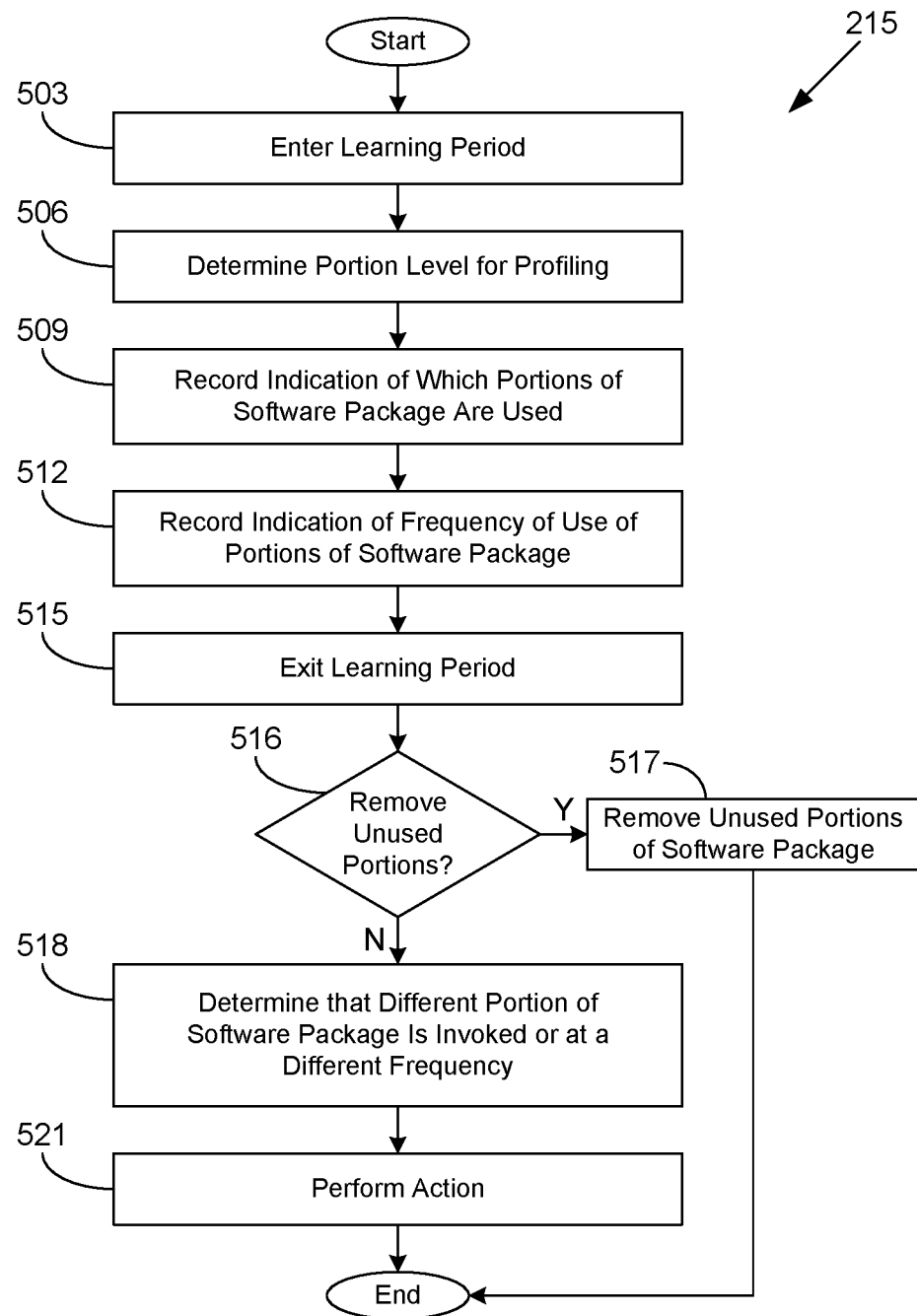
FIGS. 5 and 6 are flowcharts illustrating examples of functionality implemented as portions of a monitoring service executed in a computing environment in the networked environment of FIG. 2 according to various embodiments of the present disclosure.

Referring next to FIG. 5, shown is a flowchart that provides one example of the operation of a portion of the monitoring service 215 according to various embodiments. It is understood that the flowchart of FIG. 5 provides merely an example of the many different types of functional arrangements that may be employed to implement the operation of the portion of the monitoring service 215 as described herein. As an alternative, the flowchart of FIG. 5 may be viewed as depicting an example of elements of a method implemented in the computing environment 203 (FIG. 2) according to one or more embodiments.

Beginning with box 503, the monitoring service 215 enters a learning period. In this regard, the monitoring service 215 is prepared via code instrumentation to observe which portions of an imported software package 233 (FIG. 2) are actually used by a service 224 (FIG. 2) or other trusted code 248 (FIG. 2) executed in the computing environment 203. In box 506, the monitoring service 215 determines a portion level for profiling purposes. For example, the monitoring service 215 may determine the portion level to be class level, method level, instruction level, or another portion level. Lower levels provide finer granularity for monitoring purposes but may have greater overhead.

In box 509, the monitoring service 215 records an indication in the code portion profiling data 266 (FIG. 2) of which portions of an imported software package 233 are used, invoked, or accessed. Depending on the portion level, the monitoring service 215 may indicate that certain classes, methods/procedures, or instructions are accessed. In box 512, the monitoring service 215 may record an indication in the code portion profiling data 266 of frequency of use for each of the used, invoked, or accessed portions. After reaching a confidence level that the expected uses are documented and profiled, the monitoring service 215 exits the learning period at box 515.

In box 516, the monitoring service 215 determines whether the unused portions of the imported software package 223 are to be removed or otherwise rendered inaccessible. If so, in box 517, the monitoring service 215 initiates or configures a removal of the unused portions of the imported software package 233 from the computing environment 203. Thereafter, the operation of the portion of the monitoring service 215 ends.

If the unused portions of the imported software package 233 are not to be removed or rendered inaccessible, the monitoring service 215 instead continues from box 516 to box 518. In box 518, after exiting the learning period and entering an enforcement period, the monitoring service 215 determines that a different portion of the imported software package 233 is being used, invoked, or accessed. Alternatively, the monitoring service 215 may determine that a portion of the imported software package 233 is being accessed at an increased frequency compared to the baseline rate observed during the learning period, where the difference in frequency exceeds a threshold.

For example, during the learning period, the service 224 may have invoked a certain method once during a week, but now the service 224 is invoking the same method once per second. A change from once per week to once per day may not meet the difference threshold, but the change to once per second would. The determination may be made through comparison of the current access with profiled accesses recorded in the code portion profiling data 266.

In box 521, the monitoring service 215 performs one or more actions in response to the determinations of box 518. For example, the monitoring service 215 may send a notification to a supervisory user, block execution of the portion of the imported software package 233, re-enter the learning period, or perform another action.

The monitoring service 215 may re-enter the learning period upon determining that the service 224 has changed, the imported software package 233 has changed, or the customers of the service 224 have changed (as recorded in the customer data 263). A change in customers may cause the service 224 to use different portions of the imported software package 233 or to use portions at a different frequency depending on behavior of service clients 251 (FIG. 2).

Also, the portion granularity level for monitoring purposes may be adjusted dynamically based at least in part on a performance of a computing device in the computing environment 203. For example, if processor and memory resources are overloaded, it may make sense for the monitoring service 215 to monitor at the class level rather than the procedure level to reduce overhead. Thereafter, the portion of the monitoring service 215 ends.

Figure 6:
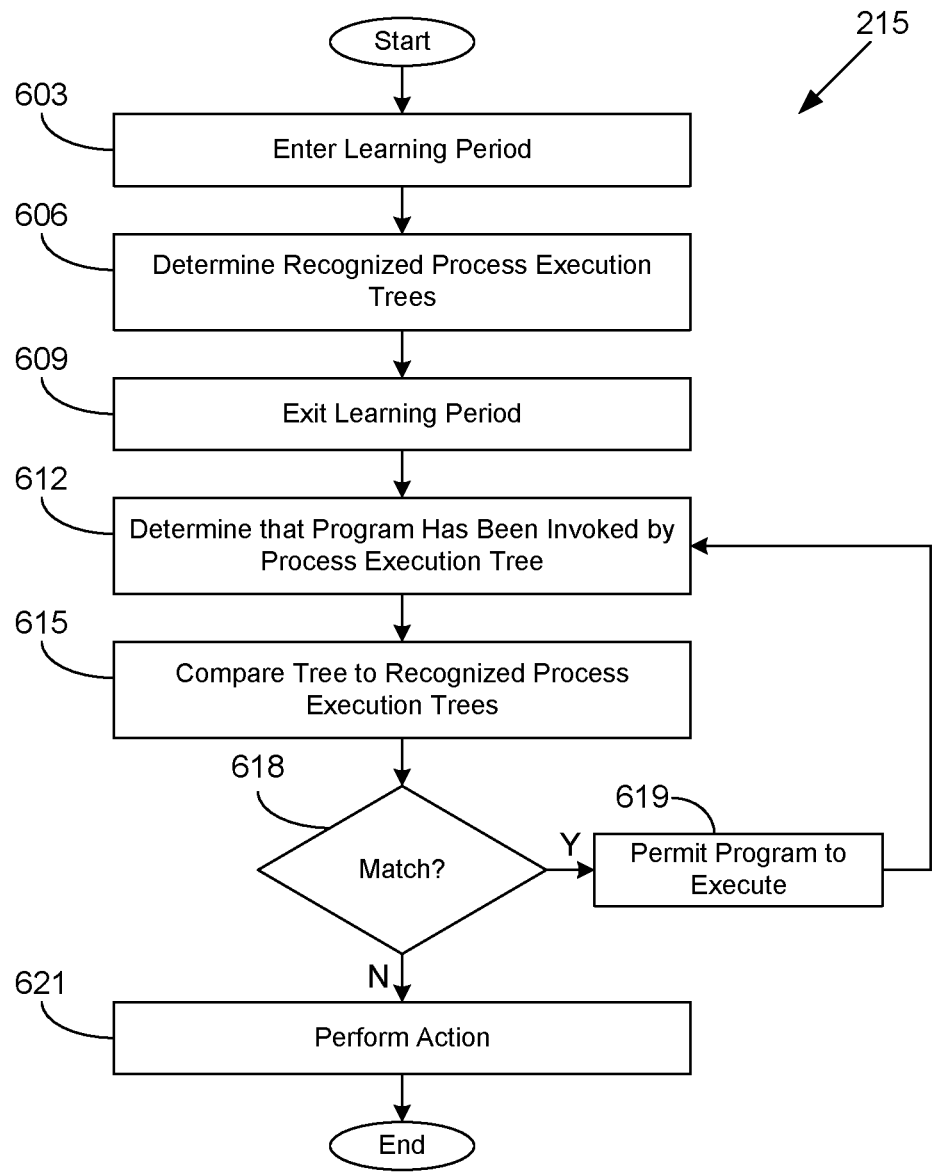

Moving on to FIG. 6, shown is a flowchart that provides one example of the operation of a portion of the monitoring service 215 according to various embodiments. It is understood that the flowchart of FIG. 6 provides merely an example of the many different types of functional arrangements that may be employed to implement the operation of the portion of the monitoring service 215 as described herein. As an alternative, the flowchart of FIG. 6 may be viewed as depicting an example of elements of a method implemented in the computing environment 203 (FIG. 2) according to one or more embodiments.

Beginning with box 603, the monitoring service 215 enters a learning period. In box 606, the monitoring service 215 determines recognized process execution trees and profiles them as recognized process execution trees 260 (FIG. 2). The process execution trees may be determined for specific target programs, for instance, corresponding to imported software packages 233 (FIG. 2) or untrusted code 230 that is privileged or whitelisted in some way. The process execution trees may include for each node a process name, a process hash or fingerprint, parameters, start time, uptime, etc. Programs that are expected to call many other programs (e.g., shells) may be excluded from this profiling.

In one embodiment, the monitoring service 215 may determine the process execution trees via a "pstree" utility. Such a utility may be executed on a periodic basis to obtain updated data. In some cases, the monitoring service 215 may also profile the parameters passed to the program, thereby generating parameter profiling data 269 (FIG. 2). The monitoring service 215 may normalize the process execution trees by removing loops and repeated iterations. In box 609, the monitoring service 215 exits the learning period.

In box 612, after exiting the learning period and entering an enforcement period, the monitoring service 215 determines that a program (such as a whitelisted program 125 (FIG. 1D) has been invoked by a process execution tree. In box 615, the monitoring service 215 compares the process execution tree to the recognized process execution trees 260. In some situations, recognized process execution trees 260 may be shared among multiple computing devices or hosts that have similar configurations. In addition, the monitoring service 215 may determine whether the program has been invoked with expected parameters in terms of quantity, size, data types, content, etc., as indicated in the parameter profiling data 269.

In box 618, the monitoring service 215 determines whether a match is found. In performing the comparison, the monitoring service 215 may normalize the process execution tree by removing loops and/or iterations. In some cases, Bloom filters or hashing may be employed in the recognized process execution trees 260 to speed match determination. A hash of the program may also be included to ensure that the recognized process execution trees 260 reference the same program rather than another one having the same name. The match may be a full match or a partial match with a certain confidence level. If a full match is found, or if a partial match is found with a confidence level meeting a threshold, the monitoring service 215 moves from box 618 to box 619 and permits the program to execute. The monitoring service 215 may then return to box 612 and determine that another program has been invoked by a process execution tree.

If instead no match is found, the monitoring service 215 moves from box 618 to box 621 and performs one or more actions in response. For example, the program may be removed from a whitelist, all or a subset of the processes in the process execution tree may be terminated, an alarm notification may be sent to a supervisory user, the learning period may be re-entered, etc. Also, the monitoring service 215 may submit the process execution tree for a manual confirmation. If a manual confirmation is received, the process execution tree may be added to the recognized process execution trees 260. Thereafter, the portion of the monitoring service 215 ends.

Figure 7:
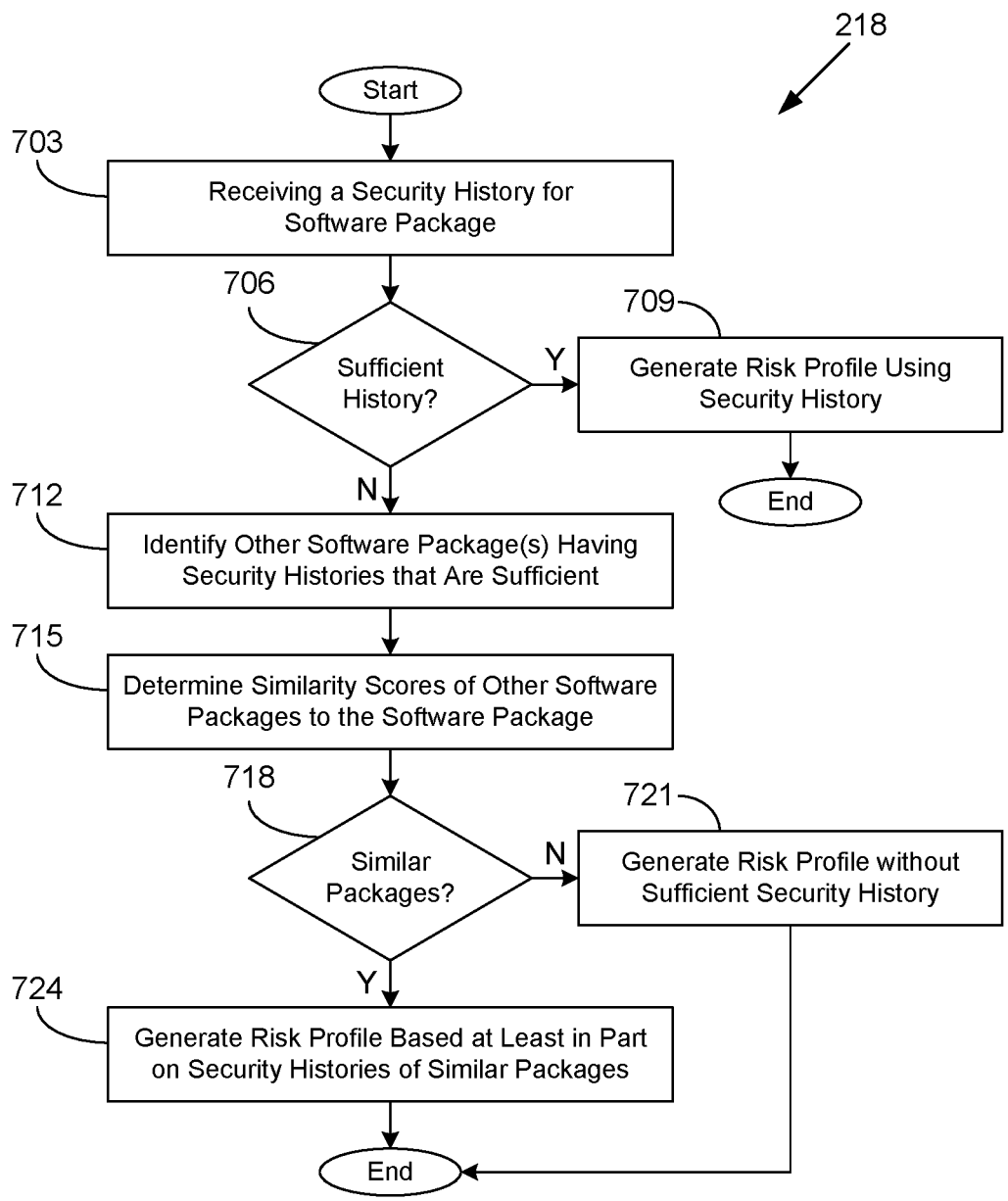
FIG. 7 is a flowchart illustrating one example of functionality implemented as portions of a risk profiling application executed in a computing environment in the networked environment of FIG. 2 according to various embodiments of the present disclosure.

Referring next to FIG. 7, shown is a flowchart that provides one example of the operation of a portion of the risk profiling application 218 according to various embodiments. It is understood that the flowchart of FIG. 7 provides merely an example of the many different types of functional arrangements that may be employed to implement the operation of the portion of the risk profiling application 218 as described herein. As an alternative, the flowchart of FIG. 7 may be viewed as depicting an example of elements of a method implemented in the computing environment 203 (FIG. 2) according to one or more embodiments.

Beginning with box 703, the risk profiling application 218 receives a security history 245 (FIG. 2) for an imported software package 233 (FIG. 2). For example, the risk profiling application 218 may obtain the security history 245 from an external software information service 281 (FIG. 2). In box 706, the risk profiling application 218 determines whether the security history 245 meets a threshold for sufficiency. The security history 245 may meet the sufficiency threshold if it has at least a predetermined number of reported issues, if it has been generated over at least a predefined period of time, and/or if it meets other criteria. If the security history 245 meets the sufficiency threshold, the risk profiling application 218 moves from box 706 to box 709 and generates a risk profile 242 (FIG. 2) using the security history 245. Thereafter, the portion of the risk profiling application 218 ends.

If instead the risk profiling application 218 determines that the security history 245 does not meet the sufficiency threshold, the risk profiling application 218 moves from box 706 to box 712 and identifies one or more other imported software packages 233 that are associated with corresponding security histories 245 that do meet the sufficiency threshold. In box 715, the risk profiling application 218 determines similarity scores of the other imported software packages 233 relative to the current imported software package 233 that lacks a sufficient security history 245. The similarity scores may be determined with reference to information about the imported software packages 233 that is obtained from the external software information service 281 or is obtained by examining or profiling the imported software packages 233. A similarity score may correspond to a sum of a plurality of weighted factors.

Many different factors may be employed to determine whether imported software packages 233 are similar in this regard. Different factors may be assigned different weights in computing the similarity score. Examples may include country or geographic region of origin, number of contributors, identity of contributors, programming languages used, development activity rates, design patterns used, affiliation of developers with the same organization, type of license, dependency packages used, number of dependency packages, code size, cyclomatic complexity, and/or other factors. In one example, software that uses a particular programming language may be prone to vulnerabilities by virtue of issues with that language. In another example, a first country may be widely known for originating highly reliable code with few vulnerabilities, while a second country may be widely known for sloppy coding practices.

In another example, software with many contributors may be identified with more known vulnerabilities (vulnerabilities may be more easily introduced and discovered), while software with fewer contributors may be identified with unknown vulnerabilities. In some cases, the involvement of specific contributors may signal the quality of a project or lack of quality of a project. A type of license may loosely correspond to a type of coding practice employed by a group of people that tend to use a common license. For example, a little used license type may be employed by developers who were trained at a certain college and have likely adopted similar coding styles. Highly complex code, as indicated for example by cyclomatic complexity or other measures, may be associated with more security vulnerabilities.

In box 718, the risk profiling application 218 determines whether the other imported software packages 233 are deemed sufficiently similar, or having a similarity score meeting a similarity threshold. If the other imported software packages 233 are not sufficiently similar, the risk profiling application 218 moves from box 718 to box 721 and generates the risk profile 242 for the imported software package 233 without a sufficient security history 245. Thereafter, the portion of the risk profiling application 218 ends.

If one or more similar packages are identified, the risk profiling application 218 transitions from box 718 to box 724 and generates a risk profile 242 for the current imported software package 233 using a security history 245 that has been augmented with the security histories 245 of the similar packages. Thereafter, the portion of the risk profiling application 218 ends.

The generated risk profiles 242 may indicate a baseline level of risk for the imported software package 233. This baseline level of risk may be used as a factor in blocking use of an imported software package 233 in a networked environment 200 (FIG. 2), restricting privileges for an imported software package 233, causing supervision of the imported software package 233 by the monitoring service 215 (FIG. 2), and/or other actions. Also, a security report for the imported software package 233 may be generated based at least in part on the augmented security history 245 for review by a supervisory user.

Figure 8:
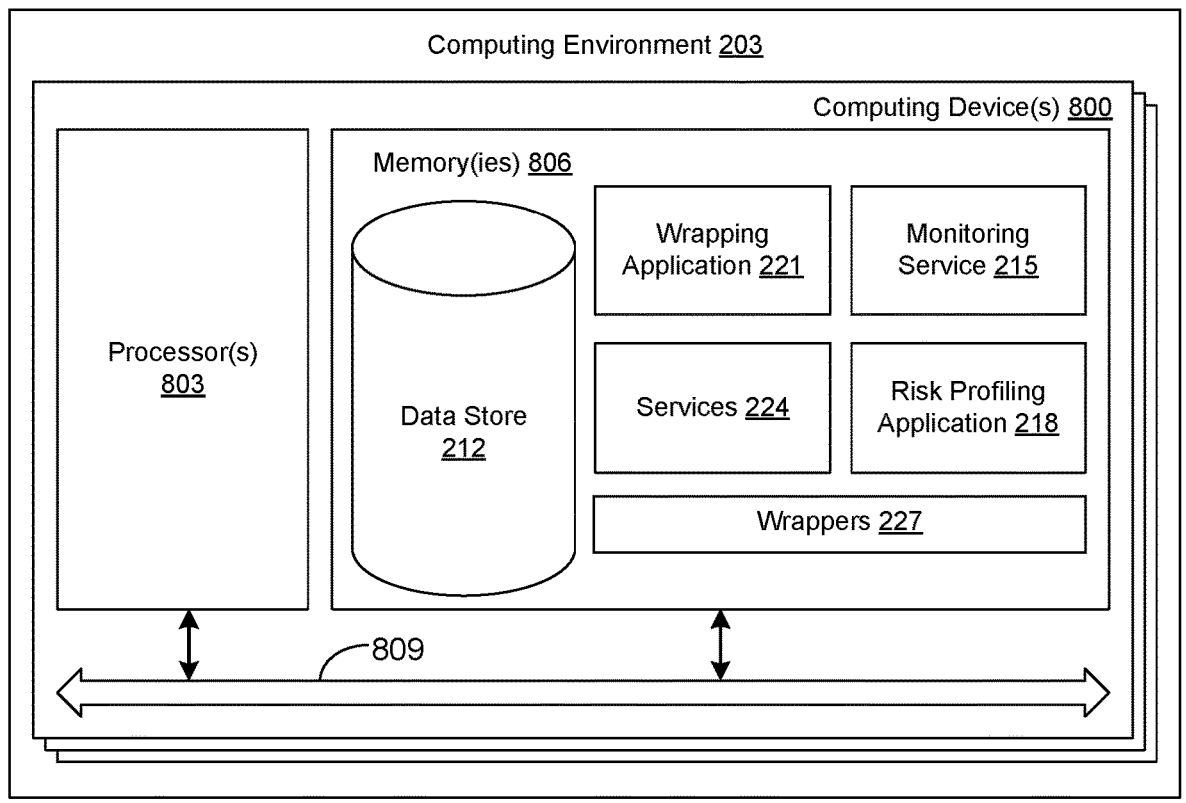
FIG. 8 is a schematic block diagram that provides one example illustration of a computing environment employed in the networked environment of FIG. 2 according to various embodiments of the present disclosure.

With reference to FIG. 8, shown is a schematic block diagram of the computing environment 203 according to an embodiment of the present disclosure. The computing environment 203 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the monitoring service 215, the risk profiling application 218, the wrapping application 221, the services 224, the wrappers 227, and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the monitoring service 215, the risk profiling application 218, the wrapping application 221, the services 224, the wrappers 227, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-7 show the functionality and operation of an implementation of portions of the monitoring service 215, the risk profiling application 218, and the wrapping application 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 3-7 show a specific order of execution, it is understood that the order of execution may differ from that which is depicted. For example, the order of execution of two or more blocks may be scrambled relative to the order shown. Also, two or more blocks shown in succession in FIGS. 3-7 may be executed concurrently or with partial concurrence. Further, in some embodiments, one or more of the blocks shown in FIGS. 3-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the monitoring service 215, the risk profiling application 218, the wrapping application 221, the services 224, and the wrappers 227, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the monitoring service 215, the risk profiling application 218, the wrapping application 221, the services 224, and the wrappers 227, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the disclosure can be described in view of the following clauses:

Clause 1. A method, comprising: recording, via at least one of one or more computing devices, a plurality of call stacks corresponding to at least one privileged operation invoked by untrusted code during a learning period; after exiting the learning period, determining, via at least one of the one or more computing devices, that the untrusted code executing in the one or more computing devices has invoked a particular privileged operation; identifying, via at least one of the one or more computing devices, a particular call stack that invoked the particular privileged operation; determining, via at least one of the one or more computing devices, that the particular call stack does not correspond to any of the plurality of call stacks for the particular privileged operation; and blocking, via at least one of the one or more computing devices, completion of the particular privileged operation.

Clause 2. The method of clause 1, further comprising comparing, via at least one of the one or more computing devices, a hash of the particular call stack with a respective hash of at least one of the plurality of call stacks.

Clause 3. The method of clauses 1 to 2, further comprising sending, via at least one of the one or more computing devices, an alarm notification to a supervisory user.

Clause 4. A system, comprising: at least one computing device; and a monitoring service executed in the at least one computing device, wherein when executed the monitoring service causes the at least one computing device to at least: determine that untrusted code executing in the at least one computing device has invoked a privileged operation; identify a context in which the privileged operation was invoked; determine that the context and the privileged operation do not correspond to an expected behavior of the untrusted code based at least in part on a past behavior profile of the untrusted code; and perform an action in response to determining that the context and the privileged operation do not correspond to the expected behavior.

Clause 5. The system of clause 4, wherein the expected behavior includes expected parameter information for the privileged operation.

Clause 6. The system of clauses 4 to 5, wherein when executed the monitoring service is further configured to at least generate the past behavior profile for the untrusted code based at least in part on an activity of the untrusted code during a learning period.

Clause 7. The system of clause 6, wherein when executed the monitoring service is further configured to at least reenter the learning period in response to determining that the untrusted code has been updated.

Clause 8. The system of clauses 6 to 7, wherein when executed the monitoring service is further configured to at least exit the learning period in response to determining that the activity of the untrusted code meets a threshold for consistency with a past activity of the untrusted code.

Clause 9. The system of clauses 6 to 8, wherein when executed the monitoring service is further configured to at least generate the past behavior profile for the untrusted code by recording individual call stacks associated with a plurality of invocations of at least one privileged operation by the untrusted code during the learning period.

Clause 10. The system of clauses 4 to 9, wherein the past behavior profile includes a plurality of hashes corresponding to a plurality of past call stacks for at least one privileged operation.

Clause 11. The system of clause 10, wherein determining that the context and the privileged operation do not correspond to the expected behavior of the untrusted code further comprises: generating a particular hash based at least in part on a call stack that invoked the privileged operation; comparing the particular hash with the plurality of hashes; and determining that the particular hash does not match any of the plurality of hashes.

Clause 12. The system of clauses 4 to 11, wherein the action includes sending an alarm notification to a supervisory user.

Clause 13. The system of clauses 4 to 12, wherein the action includes blocking completion of the privileged operation.

Clause 14. The system of clauses 4 to 13, wherein the action includes blocking a future execution of the untrusted code.

Clause 15. The system of clauses 4 to 14, wherein the privileged operation comprises at least one of: a file access operation, an inter-process communication operation, or a network access operation.

Clause 16. A method, comprising: determining, via at least one of one or more computing devices, that untrusted code executing in the one or more computing devices has invoked a privileged operation; identifying, via at least one of the one or more computing devices, a context in which the privileged operation was invoked; determining, via at least one of the one or more computing devices, whether the context and the privileged operation corresponds to an expected behavior of the untrusted code based at least in part on a past behavior profile of the untrusted code; and permitting, via at least one of the one or more computing devices, the privileged operation to complete in response to determining that the context and the privileged operation correspond to the expected behavior.

Clause 17. The method of clause 16, further comprising generating, via at least one of the one or more computing devices, the past behavior profile based at least in part on a plurality of past call stacks corresponding to at least one privileged operation invoked by the untrusted code during a learning period.

Clause 18. The method of clause 17, further comprising: determining, via at least one of the one or more computing devices, that the untrusted code has been updated; and reentering, via at least one of the one or more computing devices, the learning period.

Clause 19. The method of clauses 17 to 18, further comprising: determining, via at least one of the one or more computing devices, that an activity of the untrusted code meets a threshold for consistency with a past activity of the untrusted code; and exiting, via at least one of the one or more computing devices, the learning period.

Clause 20. The method of clauses 17 to 19, further comprising storing, via at least one of the one or more computing devices, the past behavior profile as a Bloom filter.

Clause 21. A method, comprising: receiving, via at least one of one or more computing devices, trusted source code configured to use untrusted code from a third-party library via at least one procedure call; determining, via at least one of the one or more computing devices, a set of privileged operations performed by the untrusted code; generating, via at least one of the one or more computing devices, a process wrapper for the untrusted code; assigning, via at least one of the one or more computing devices, a privilege level to the process wrapper to perform the set of privileged operations; and replacing, via at least one of the one or more computing devices, the at least one call in the trusted source code with a corresponding call to the process wrapper to use the untrusted code, wherein the process wrapper is configured to be executed in a different process from the trusted source code.

Clause 22. The method of clause 21, further comprising configuring, via at least one of the one or more computing devices, the trusted source code to communicate with the process wrapper via inter-process communication.

Clause 23. A system, comprising: at least one computing device; and at least one application executed in the at least one computing device, the at least one application when executed causing the at least one computing device to at least: receive trusted code configured to use untrusted code; generate a wrapper for the untrusted code; and reconfigure the trusted code to use the wrapper instead of the untrusted code, wherein the wrapper is configured to invoke the untrusted code with reduced privileges as compared to the trusted code.

Clause 24. The system of clause 23, wherein as received, the trusted code is configured to use the untrusted code within a shared process, thereby providing a same privilege level to the untrusted code and the trusted code.

Clause 25. The system of clauses 23 to 24, wherein reconfiguring the trusted code further comprises modifying a package import statement in the trusted code to point to a package of the wrapper.

Clause 26. The system of clauses 23 to 25, wherein reconfiguring the trusted code further comprises replacing at least one call to the untrusted code in the trusted code with at least one replacement call to the wrapper.

Clause 27. The system of clauses 23 to 26, wherein the wrapper is configured to be executed in a separate thread of a process in which the trusted code executes.

Clause 28. The system of clauses 23 to 27, wherein the wrapper is configured to be executed by a different host as compared to the trusted code.

Clause 29. The system of clauses 23 to 28, wherein the wrapper facilitates communication between the trusted code and the untrusted code via inter-process communication.

Clause 30. The system of clauses 23 to 29, wherein when executed the at least one application further causes the at least one computing device to: compile the untrusted code into a first program; and compile at least a portion of the wrapper into a second program, wherein the first program and the second program are configured to be executed as different processes.

Clause 31. The system of clause 30, wherein the first program is permitted to perform a first privileged operation and a second privileged operation, and the second program is permitted to perform the first privileged operation but not the second privileged operation.

Clause 32. The system of clauses 23 to 31, wherein when executed the at least one application further causes the at least one computing device to profile the untrusted code to determine a privilege level for the untrusted code.

Clause 33. The system of clauses 23 to 32, wherein when executed the at least one application further causes the at least one computing device to receive a manually specified privilege level for the untrusted code.

Clause 34. A method, comprising: receiving, via at least one of one or more computing devices, trusted code configured to invoke untrusted code; generating, via at least one of the one or more computing devices, a wrapper for the untrusted code; and configuring, via at least one of the one or more computing devices, the trusted code to invoke the wrapper to access the untrusted code, wherein the wrapper is configured to be executed in a different process from the trusted code.

Clause 35. The method of clause 34, wherein generating, via at least one of the one or more computing devices, the wrapper further comprises generating, via at least one of the one or more computing devices, a proxy procedure for individual ones of a plurality of public procedures in the untrusted code.

Clause 36. The method of clauses 34 to 35, wherein the trusted code is configured to invoke other untrusted code when received, and the method further comprises: generating, via at least one of the one or more computing devices, another wrapper for the other untrusted code; and configuring, via at least one of the one or more computing devices, the trusted code to invoke the other wrapper to access the other untrusted code, wherein the wrapper and the other wrapper are configured to use separate processes having different privilege levels.

Clause 37. The method of clauses 34 to 36, further comprising configuring, via at least one of the one or more computing devices, the trusted code to communicate with the wrapper via inter-process communication.

Clause 38. The method of clause 34 to 37, further comprising removing, via at least one of the one or more computing devices, the untrusted code from a scope of the trusted code.

Clause 39. The method of clauses 34 to 38, further comprising assigning, via at least one of the one or more computing devices, a reduced privilege level to the wrapper as compared to the trusted code.

Clause 40. The method of clauses 34 to 39, further comprising: determining, via at least one of the one or more computing devices, a set of privileged operations used by the untrusted code; and configuring, via at least one of the one or more computing devices, the wrapper to have at least one privilege to perform the set of privileged operations.

Clause 41. A method, comprising: during a learning period, recording, via at least one of one or more computing devices, an indication of which of a plurality of portions of an imported software package are invoked by a service; after the learning period, determining, via at least one of the one or more computing devices, that a different portion of the imported software package is invoked by the service, the different portion being different than those invoked by the service during the learning period; and blocking, via at least one of the one or more computing devices, execution of the different portion of the imported software package in response to determining that the different portion of the imported software package is invoked by the service; and re-entering, via at least one of the one or more computing devices, the learning period in response to at least one of: determining, via at least one of the one or more computing devices, that the service has changed; determining, via at least one of the one or more computing devices, that the imported software package has changed; or determining, via at least one of the one or more computing devices, that a customer of the service has changed.

Clause 42. The method of clause 41, further comprising adjusting, via at least one of the one or more computing devices, a portion granularity for monitoring execution of the imported software package based at least in part on a computing device performance.

Clause 43. The method of clauses 41 to 42, further comprising sending, via at least one of the one or more computing devices, a notification to a supervisory user in response to determining that the different portion of the imported software package is invoked by the service.

Clause 44. A system, comprising: at least one computing device; and at least one monitoring service executed in the at least one computing device, wherein when executed the at least one monitoring service causes the at least one computing device to at least: receive an indication of which of a plurality of portions of an imported software package are invoked by a service during a learning period; after the learning period, determine that a different portion of the imported software package is invoked by the service, the different portion being different than those invoked by the service during the learning period; and perform an action in response to determining that the different portion of the imported software package is invoked by the service.

Clause 45. The system of clause 44, wherein when executed the at least one monitoring service further causes the at least one computing device to at least: after the learning period, determine that a portion of the imported software package that was invoked by the service during the learning period is presently being invoked by the service at an increased rate as compared to a baseline rate during the learning period, wherein a difference between the increased rate and the baseline rate exceeds a threshold; and perform another action in response to determining that the portion of the imported software package is presently being invoked by the service at the increased rate.

Clause 46. The system of clauses 44 to 45, wherein the action comprises sending an alarm notification to a supervisory user.

Clause 47. The system of clauses 44 to 46, wherein the action comprises blocking execution of the different portion of the imported software package.

Clause 48. The system of clauses 44 to 47, wherein the plurality of portions of the imported software package correspond to a plurality of classes, and the different portion corresponds to a particular one of the plurality of classes.

Clause 49. The system of clauses 44 to 48, wherein the plurality of portions of the imported software package correspond to a plurality of methods, and the different portion corresponds to a particular one of the plurality of methods.

Clause 50. The system of clauses 44 to 49, wherein when executed the at least one monitoring service further causes the at least one computing device to at least reenter the learning period in response to determining a change in the service.

Clause 51. The system of clauses 44 to 50, wherein when executed the at least one monitoring service further causes the at least one computing device to at least reenter the learning period in response to determining a change in the imported software package.

Clause 52. The system of clauses 44 to 51, wherein when executed the at least one monitoring service further causes the at least one computing device to at least reenter the learning period in response to determining a change in a customer of the service.

Clause 53. A method, comprising: receiving, via at least one of one or more computing devices, a plurality of recognized process execution trees recorded during a learning period; after the learning period, determining, via at least one of the one or more computing devices, that a program has been invoked by a process execution tree; determining, via at least one of the one or more computing devices, that the process execution tree does not match any of the plurality of recognized process execution trees; and performing, via at least one of the one or more computing devices, an action with respect to the program in response to determining that the process execution tree does not match any of the plurality of recognized process execution trees.

Clause 54. The method of clause 53, further comprising upon receiving a manual confirmation, adding, via at least one of the one or more computing devices, the process execution tree to the plurality of recognized process execution trees.

Clause 55. The method of clauses 53 to 54, wherein the one or more computing devices comprises a first computing device and a second computing device, the plurality of recognized process execution trees are determined with respect to the first computing device, and the program is executed via the second computing device.

Clause 56. The method of clauses 53 to 55, further comprising determining, via at least one of the one or more computing devices, whether the process execution tree is associated with an expected parameter size to invoke the program.

Clause 57. The method of clauses 53 to 56, further comprising determining, via at least one of the one or more computing devices, whether the process execution tree is associated with an expected number of parameters to invoke the program.

Clause 58. The method of clauses 53 to 57, wherein the action comprises reducing privileges of the program.

Clause 59. The method of clauses 53 to 58, wherein the action comprises terminating all or a subset of a plurality of processes represented in the process execution tree.

Clause 60. The method of clauses 53 to 59, wherein the action comprises sending an alarm notification to a supervisory user.

Clause 61. A system, comprising: at least one computing device; and at least one monitoring service executed in the at least one computing device, wherein when executed the at least one monitoring service causes the at least one computing device to at least: identify at least one portion of an imported software package that is not invoked by a service during a learning period; and block the at least one portion of the imported software package from being executed by the service after the learning period.

Clause 62. The system of clause 61, wherein when executed the at least one monitoring service further causes the at least one computing device to at least: after the learning period, determine that the service has attempted to invoke the at least one portion of the imported software package; and perform an action in response to determining that the service has attempted to invoke the at least one portion of the imported software package.

Clause 63. The system of clauses 61 to 62, wherein when executed the at least one monitoring service further causes the at least one computing device to at least reenter the learning period in response to determining a change in the imported software package or in a customer of the service.

Clause 64. A method, comprising: receiving, via at least one of one or more computing devices, a security history for a software package; determining, via at least one of the one or more computing devices, that the security history does not meet a sufficiency threshold; identifying, via at least one of the one or more computing devices, at least one other software package that has a corresponding security history that meets the sufficiency threshold; determining, via at least one of the one or more computing devices, a similarity score of a similarity between the software package and the at least one other package, the similarity score comprising a sum of a plurality of weighted factors; determining, via at least one of the one or more computing devices, that the similarity score meets a minimum threshold; and generating, via at least one of the one or more computing devices, a risk profile of the software package based at least in part on the corresponding security history of the at least one other software package.

Clause 65. The method of clause 64, further comprising blocking, via at least one of the one or more computing devices, use of the software package in a networked environment in response to the risk profile.

Clause 66. The method of clauses 64 to 65, wherein the sufficiency threshold is met when the security history is associated with at least a predefined period of time.

Clause 67. A system, comprising: at least one computing device; and a risk profiling application executed in the at least one computing device, wherein when executed the risk profiling application causes the at least one computing device to at least: receive a security history for a software package; determine that the security history does not meet a sufficiency threshold; identify at least one other software package that is similar to the software package and has a corresponding security history that meets the sufficiency threshold; and generate a risk profile of the software package based at least in part on the corresponding security history of the at least one other software package.

Clause 68. The system of clause 67, wherein the corresponding security history indicates that the at least one other software package has suffered from at least one of: a remote code exploit or a denial of service vulnerability.

Clause 69. The system of clauses 67 to 68, wherein the at least one other software package is similar to the software package when a similarity score meets a threshold.

Clause 70. The system of clause 69, wherein the similarity score is a sum of a plurality of weighted factors.

Clause 71. The system of clauses 69 to 70, wherein a factor in the similarity score is whether the software package and the at least one other software package have a same type of license.

Clause 72. The system of clauses 69 to 71, wherein a factor in the similarity score is whether the software package and the at least one other software package have a similar number of contributors.

Clause 73. The system of clauses 69 to 72, wherein a factor in the similarity score is whether the software package and the at least one other software package have a same contributor.

Clause 74. The system of clauses 69 to 73, wherein a factor in the similarity score is whether the software package and the at least one other software package have a similar development activity rate.

Clause 75. The system of clauses 69 to 74, wherein a factor in the similarity score is whether the software package and the at least one other software package have a similar cyclomatic complexity.

Clause 76. The system of clauses 69 to 75, wherein a factor in the similarity score is whether the software package and the at least one other software package have a similar code size or a similar number of dependency packages.

Clause 77. The system of clauses 69 to 76, wherein a factor in the similarity score is whether the software package and the at least one other software package use a same programming language or a same dependency package.

Clause 78. The system of clauses 69 to 77, wherein a factor in the similarity score is whether the software package and the at least one other software package have a same country of origin or originate from at least one developer affiliated with a same organization.

Clause 79. A method, comprising: receiving, via at least one of one or more computing devices, a security history for a software package; determining, via at least one of the one or more computing devices, that the security history does not meet a sufficiency threshold; identifying, via at least one of the one or more computing devices, another software package having a security history that meets the sufficiency threshold; determining, via at least one of the one or more computing devices, that a similarity score indicating a similarity between the software package and the other software package meets a minimum threshold; and augmenting, via at least one of the one or more computing devices, the security history of the software package with at least a portion of the security history of the other software package.

Clause 80. The method of clause 79, wherein the similarity score is determined based at least in part on a plurality of factors including at least one of: a similarity of cyclomatic complexity, a similar development activity rate, or a similarity in contributors.

Clause 81. The method of clauses 79 to 80, wherein the similarity score is determined based at least in part on a plurality of factors including at least one of: a country of origin, a programming language used, a dependency package used, or a software design pattern used.

Clause 82. The method of clauses 79 to 81, further comprising blocking, via at least one of the one or more computing devices, use of the software package based at least in part on the security history of the other software package.

Clause 83. The method of clauses 79 to 82, further comprising generating, via at least one of the one or more computing devices, a security report for the software package from the security history that has been augmented.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    at least one computing device including at least one memory and at least one processor; and
    at least one application executed by the at least one processor of the at least one computing device, wherein when executed the at least one application causes the at least one computing device to at least:
        during a learning period in which execution of a software package is monitored, determine which of a plurality of portions of the software package are invoked, wherein the software package comprises at least one of: executable code or library code;
        determine at least one unused portion of the software package based at least in part on the portions of the software package invoked during the learning period; and
        prevent the at least one unused portion of the software package from being accessed by a different program after the learning period by blocking the at least one unused portion of the software package or removing the at least one unused portion of the software package from the software package.

2. The system of claim 1, wherein preventing the at least one unused portion of the software package from being accessed comprises removing the at least one unused portion of the software package from the software package.

3. The system of claim 1, wherein when executed the at least one application further causes the at least one computing device to at least:
    after the learning period, determine that a different portion of the software package is requested to be invoked, the different portion being different than the portions of the software package invoked during the learning period; and
    perform an action in response to determining that the different portion of the software package is requested to be invoked.

4. The system of claim 3, wherein the action comprises at least one of: reinitiating the learning period or blocking the different portion of the software package.

5. The system of claim 1, wherein when executed the at least one application further causes the at least one computing device to at least reenter the learning period in response to determining a change in the software package.

6. The system of claim 1, wherein the software package is one of: an open source software package or a third party software package.

7. The system of claim 1,
    wherein preventing the at least one unused portion of the software package from being accessed comprises blocking the at least one unused portion of the software package.

8. A method, comprising:
    during a learning period in which execution of a software package is monitored, recording in a memory of at least one of one or more computing devices, at least one portion of the software package invoked during execution of the software package in the learning period, wherein the software package comprises at least one of: executable code or library code;
    after the learning period, determining, via at least one service executed by at least one of the one or more computing devices, at least one unused portion of the software package based at least in part on the at least one portion of the software package invoked during the learning period; and
    performing, via the at least one service executed by at least one of the one or more computing devices, an action with respect to the at least one unused portion of the software package that prevents a different program from accessing the at least one unused portion of the software package after the learning period, wherein the action comprises blocking the at least one unused portion of the software package or removing the at least one unused portion of the software package from the software package.

9. The method of claim 8, wherein the action comprises blocking the at least one unused portion of the software package.

10. The method of claim 8, wherein the action comprises removing the at least one unused portion of the software package from the software package.

11. The method of claim 8, further comprising:
    determining that a different portion of the software package is invoked after the learning period; and
    performing a different action with respect to the different portion of the software package.

12. A system, comprising:
    at least one computing device including at least one memory and at least one processor; and
    at least one application executed by the at least one processor of the at least one computing device, wherein when executed the at least one application causes the at least one computing device to at least:
        during a learning period in which execution of a software package is monitored, record in a memory of at least one of one or more computing devices, at least one portion of the software package invoked during execution of the software package in the learning period, wherein the software package comprises at least one of: executable code or library code;
        after the learning period, determine at least one unused portion of the software package based at least in part on the at least one portion of the software package invoked during the learning period; and
        perform an action with respect to the at least one unused portion of the software package that prevents the at least one unused portion of the software package from being accessed by a different program after the learning period, wherein the action comprises blocking the at least one unused portion of the software package or removing the at least one unused portion of the software package from the software package.

13. The system of claim 12, wherein when executed the at least one application further causes the at least one computing device to at least:
- determine a frequency of use of the at least one portion of the software package invoked during the learning period;
- determine, for the at least one portion of the software package invoked during the learning period, that the frequency of use during the learning period is different from a frequency of use after the learning period; and
- perform another action in response to determining that the frequency of use during the learning period is different from the frequency of use after the learning period.

14. The system of claim 13, wherein the other action comprises blocking the at least one portion of the software package invoked during the learning period.

15. The system of claim 13, wherein the other action comprises reinitiating the learning period.

16. The system of claim 12, wherein preventing the at least one unused portion of the software package from being accessed further comprises removing the at least one unused portion of the software package from the software package.

17. The system of claim 12, wherein preventing the at least one unused portion of the software package from being accessed further comprises blocking the at least one unused portion of the software package.

18. The system of claim 17, wherein when executed the at least one application further causes the at least one computing device to at least send a notification to a supervisory user.

19. The system of claim 12, further comprising a data store accessible to the at least one computing device and storing the software package.

20. The system of claim 16, wherein removing the at least one unused portion of the software package from the software package renders the at least one unused portion of the software package unexecutable.

* * * * *